(12) United States Patent
Sakai et al.

(10) Patent No.: US 8,871,013 B2
(45) Date of Patent: Oct. 28, 2014

(54) INK, INK CARTRIDGE AND INK JET RECORDING METHOD

(71) Applicant: Canon Kabushiki Kaisha, Tokyo (JP)

(72) Inventors: Junichi Sakai, Machida (JP); Satoshi Kudo, Kawasaki (JP); Otome Yamashita, Yokohama (JP); Minako Kawabe, Koganei (JP); Takashi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 13/796,366

(22) Filed: Mar. 12, 2013

(65) Prior Publication Data

US 2013/0271523 A1 Oct. 17, 2013

(30) Foreign Application Priority Data

Apr. 13, 2012 (JP) ................... 2012-092382

(51) Int. Cl.
*C09D 11/02* (2014.01)
*C09D 11/328* (2014.01)

(52) U.S. Cl.
CPC ................... *C09D 11/328* (2013.01)
USPC ..................................... 106/31.47

(58) Field of Classification Search
USPC ..................................... 106/31.47
See application file for complete search history.

(56) References Cited

U.S. PATENT DOCUMENTS

| | | | |
|---|---|---|---|
| 6,966,944 B2 | 11/2005 | Shimomura et al. | |
| 7,008,977 B2 | 3/2006 | Sakai et al. | |
| 7,208,033 B2 | 4/2007 | Kawabe et al. | |
| 7,244,299 B2 | 7/2007 | Tsuji et al. | |
| 7,291,211 B2 | 11/2007 | Kaneko et al. | |
| 7,297,194 B2 | 11/2007 | Shinjo et al. | |
| 7,297,202 B2 | 11/2007 | Ichinose et al. | |
| 7,364,770 B2 | 4/2008 | Nagashima et al. | |
| 7,377,631 B2 | 5/2008 | Takada et al. | |
| 7,419,537 B2 | 9/2008 | Fujii et al. | |
| 7,445,666 B2 | 11/2008 | Yanagimachi et al. | |
| 7,585,361 B2 | 9/2009 | Yoneda et al. | |
| 7,591,888 B2 | 9/2009 | Fujii et al. | |
| 7,611,571 B2 * | 11/2009 | Yamashita et al. | 106/31.47 |
| 7,618,484 B2 | 11/2009 | Fujimoto et al. | |
| 7,637,603 B2 | 12/2009 | Kawabe et al. | |
| 7,682,433 B2 | 3/2010 | Yanagimachi et al. | |
| 7,699,924 B2 | 4/2010 | Mafune et al. | |
| 7,854,797 B2 | 12/2010 | Fujii et al. | |
| 7,868,060 B2 | 1/2011 | Sakai et al. | |
| 7,878,643 B2 | 2/2011 | Kudo et al. | |
| 7,918,928 B2 | 4/2011 | Saito et al. | |
| 7,981,204 B2 * | 7/2011 | Shimizu et al. | 106/31.47 |
| 7,988,277 B2 | 8/2011 | Moribe et al. | |
| 8,016,932 B2 | 9/2011 | Okamura et al. | |
| 8,025,722 B2 | 9/2011 | Kawabe et al. | |
| 8,029,612 B2 | 10/2011 | Ishii et al. | |
| 8,070,871 B2 | 12/2011 | Kawabe et al. | |
| 8,123,846 B2 | 2/2012 | Yamakami et al. | |
| 8,163,817 B2 | 4/2012 | Nishino et al. | |
| 8,343,269 B2 | 1/2013 | Takahashi et al. | |
| 8,389,600 B2 | 3/2013 | Suzuki et al. | |
| 8,393,726 B2 | 3/2013 | Moribe et al. | |
| 8,469,504 B2 | 6/2013 | Saito et al. | |
| 2010/0034972 A1 | 2/2010 | Mukae et al. | |
| 2011/0141186 A1 | 6/2011 | Kawabe et al. | |
| 2011/0310162 A1 | 12/2011 | Tamanuki et al. | |
| 2012/0013678 A1 * | 1/2012 | Yoneda et al. | 347/20 |
| 2012/0147083 A1 | 6/2012 | Hayashi et al. | |
| 2013/0271540 A1 * | 10/2013 | Saito et al. | 106/31.47 |

FOREIGN PATENT DOCUMENTS

| | | |
|---|---|---|
| JP | 2004-002670 A | 1/2004 |
| JP | 2004-323605 A | 11/2004 |
| JP | 2009-057540 A | 3/2009 |
| WO | 2004/087815 A1 | 10/2004 |
| WO | 2007/091631 A1 | 8/2007 |
| WO | 2007/116933 A1 | 10/2007 |
| WO | 2008/111635 A1 | 9/2008 |
| WO | WO 2010/119676 A1 * | 10/2010 |

OTHER PUBLICATIONS

English translation of JP 2004/323605; Nov. 2004.*

* cited by examiner

*Primary Examiner* — Helene Klemanski
(74) *Attorney, Agent, or Firm* — Fitzpatrick, Cella, Harper & Scinto

(57) ABSTRACT
The invention provides an ink containing a first coloring material and a second coloring material, wherein the first coloring material is a compound represented by a general formula (1), and the second coloring material is a compound represented by a general formula (2).
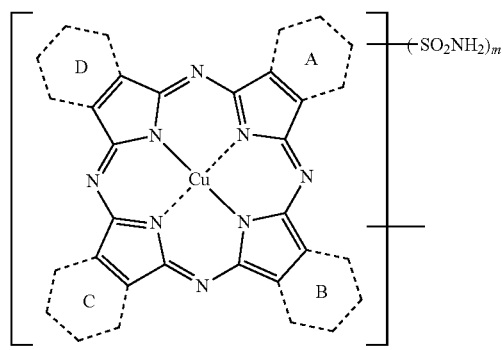
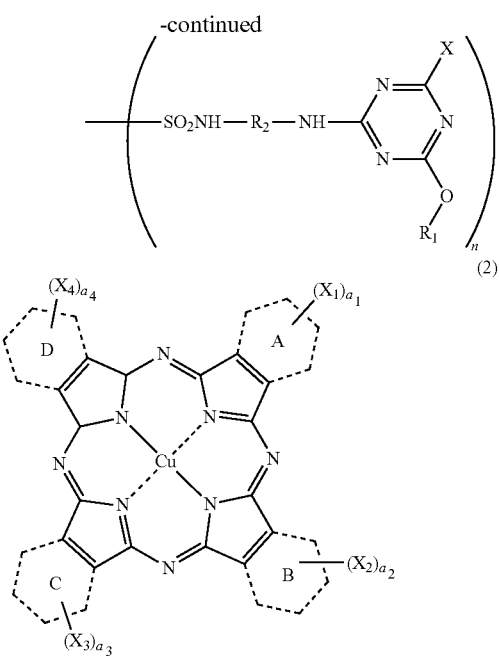
8 Claims, 2 Drawing Sheets

INK, INK CARTRIDGE AND INK JET RECORDING METHOD

BACKGROUND OF THE INVENTION

1. Field of the Invention

The present invention relates to an ink, an ink cartridge and an ink jet recording method.

2. Description of the Related Art

An ink jet recording method is such a recording method that minute droplets of an ink are applied to a recording medium such as plain paper to form an image, and is rapidly spread owing to low price of an apparatus itself and improvement of recording speed. In general, a recorded article obtained by the ink jet recording method is low in fastness properties of an image thereof compared with a silver salt photograph. In particular, when the recorded article is exposed to light, moisture, heat or environmental gas present in air, such as an ozone gas for a long period of time, there is a problem that a coloring material of the recorded article is deteriorated to easily cause change in color tone or fading of the image.

Since the change in color tone or fading of the image is caused especially by a cyan ink low in ozone resistance among respective inks of cyan, yellow and magenta as a main factor, there are a great number of proposals for improving the ozone resistance of the cyan ink. For example, there is a proposal on an ink in which two kinds of coloring materials (dyes) having a phthalocyanine skeleton are caused to be contained, thereby improving the ozone resistance of an image (see Japanese Patent Application Laid-Open No. 2009-057540).

As another problem in the cyan ink using the phthalocyanine compound, metallic luster, what is called a bronzing phenomenon, caused by high aggregation property of the phthalocyanine compound is mentioned. When the bronzing phenomenon is caused, the optical reflecting properties of the image recorded are changed, and so the hue thereof looks markedly different to cause lowering of image quality. The bronzing phenomenon is considered to be caused by aggregation of the coloring material on the surface of a recording medium or in the neighborhood thereof due to high aggregation property of the coloring material and due to lowering of permeability of an ink into the recording medium when the ink is applied to the recording medium.

SUMMARY OF THE INVENTION

The present inventors have carried out an investigation mainly as to the proposal described in Japanese Patent Application Laid-Open No. 2009-057540 for the purpose of providing a cyan ink capable of recording an image improved in both ozone resistance and bronzing resistance. However, when the ink containing the two kinds of compounds having the phthalocyanine skeleton described Japanese Patent Application Laid-Open No. 2009-057540 is used, the ozone resistance of an image recorded has fallen within an acceptable range, but the bronzing resistance thereof has been insufficient.

Accordingly, it is an object of the present invention to provide an ink capable of recording an image excellent in ozone resistance and bronzing resistance. Another object of the present invention is to provide an ink cartridge and an ink jet recording method using the above-described ink.

The above objects can be achieved by the present invention described below. That is, according to the present invention, there is provided an ink comprising a first coloring material and a second coloring material, wherein the first coloring material is a compound represented by the following general formula (1), and the second coloring material is a compound represented by the following general formula (2).

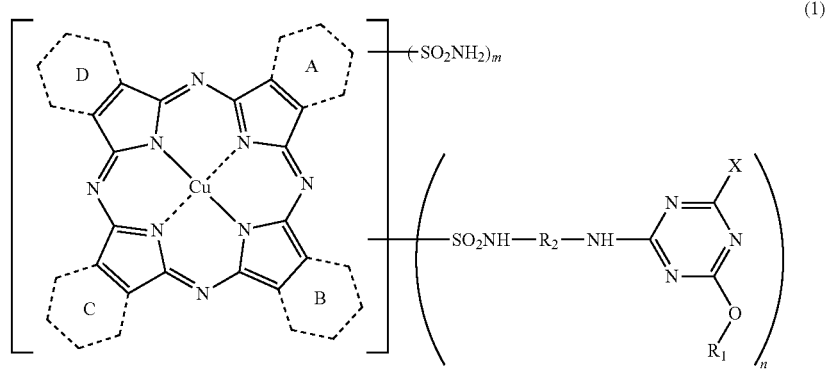

(1)

wherein rings A, B, C and D each indicated by a broken line are, independently of one another, a benzene ring or a nitrogen-containing heteroaromatic ring, the number of the nitrogen-containing heteroaromatic ring is more than 0.0 and 3.0 or less, the remainder is the benzene ring, $R_1$ is an alkyl group, $R_2$ is an alkylene group, X is an anilino group having one or more sulfonic groups, with the proviso that X may have one or more substituents selected from the group consisting of a carboxy group, a phosphoric group, a hydroxy group, an alkoxy group, an alkylcarbonylamino group, a ureido group, a nitro group and a halogen atom, m is more than 0.0 and less than 3.9, n is 0.1 or more and less than 4.0, and the sum of m and n is 1.0 or more and less than 4.0.

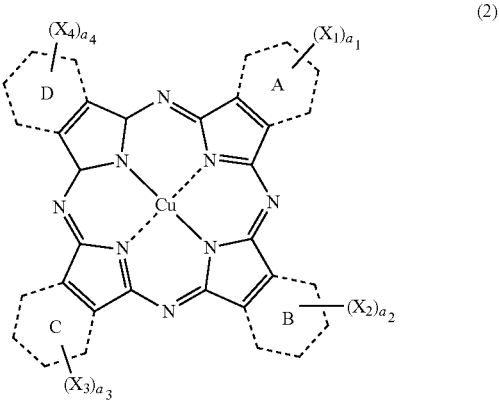

(2)

wherein rings A, B, C and D each indicated by a broken line are, independently of one another, a benzene ring or a nitrogen-containing heteroaromatic ring, $X_1$, $X_2$, $X_3$ and $X_4$ are, independently of one another, —SO—Z, —SO$_2$—Z, —SO$_2$NR$_1$R$_2$, —SO$_3$M, —CONR$_1$R$_2$ or —CO$_2$R$_1$, $a_1$, $a_2$, $a_3$ and $a_4$ are respective numbers of substituents of X$_1$, X$_2$, X$_3$ and X$_4$ and are, independently of one another, 1.0 or more and 2.0 or less, Z is a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, R$_1$ and R$_2$ are, independently of each other, a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, M is a hydrogen atom, an alkali metal, ammonium or organic ammonium, and at least one of X$_1$, X$_2$, X$_3$ and X$_4$ is a group represented by the following general formula (3):

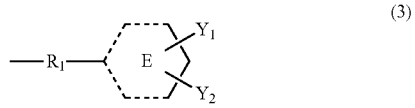

(3)

wherein a ring E indicated by a broken line is a benzene ring or a nitrogen-containing heteroaromatic ring, R$_1$ is a linking group containing an atom selected from the group consisting of sulfur, nitrogen, oxygen and carbon in a main chain thereof and linking the phthalocyanine ring to the ring E indicated by the broken line by a covalent bond, and Y$_1$ and Y$_2$ are, independently of each other, a hydrogen atom, a halogen atom, an alkyl group, an aryl group, a cyano group, an alkoxy group, an amide group, a ureido group, a sulfonamide group, a carbamoyl group, a sulfamoyl group, an alkoxycarbonyl group, a carboxy group, a sulfonic group, an amino group or a substituted or unsubstituted anilino group.

According to the present invention, there can be provided an ink capable of recording an image excellent in ozone resistance and bronzing resistance. In addition, according to the present invention, there can also be provided an ink cartridge and an ink jet recording method using this ink.

Further features of the present invention will become apparent from the following description of exemplary embodiments with reference to the attached drawings.

BRIEF DESCRIPTION OF THE DRAWINGS

FIGS. 2A and 2B schematically illustrate an exemplary ink jet recording apparatus used in an ink jet recording method according to the present invention, in which FIG. 2A is a perspective view illustrating a principal part of the ink jet recording apparatus, and FIG. 2B is a perspective view illustrating a head cartridge.

DESCRIPTION OF THE EMBODIMENTS

Figure 1:
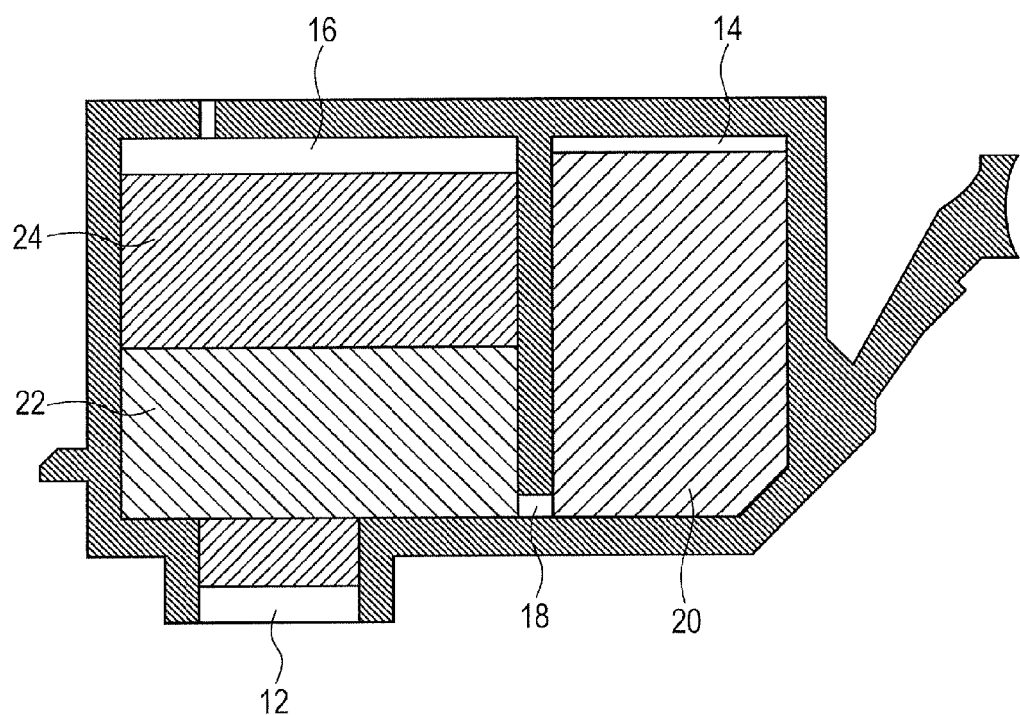
FIG. 1 is a sectional view schematically illustrating an ink cartridge according to an embodiment of the present invention.

Preferred embodiments of the present invention will now be described in detail in accordance with the accompanying drawings. Incidentally, when a compound is a salt, the salt present in an ink in a state of being dissociated into ions. In the present invention, however, this is referred to as "containing a salt" for the sake of convenience.

The present inventors have carried out an extensive investigation. As a result, it has been found that compounds each having a specified structure are caused to be contained as coloring materials in combination, thereby obtaining an ink capable of recording an image in which the occurrence of a bronzing phenomenon is suppressed while satisfying high ozone resistance. That is, the ink according to the present invention contains a first coloring material and a second coloring material that are compounds represented by the respective specified structural formulae. The first coloring material and second coloring material contained in the ink according to the present invention will hereinafter be described in detail.

Ink

First Coloring Material

The ink according to the present invention contains a compound represented by the following general formula (1) as a first coloring material. Although a compound represented by the general formula (1) is a mixture as described below, the compound is represented by the general formula (1) as a structure of a typical example of the mixture for the sake of convenience. The numbers of the respective rings and substituents are indicated as average values thereof. This coloring material is a water-soluble dye exhibiting a cyan color and may be favorably used as a coloring material for a cyan ink or for color adjustment of another color ink. Incidentally, in the present specification, the compound represented by the general formula (1) may be simply described as "first coloring material" collectively in some cases for the sake of convenience.

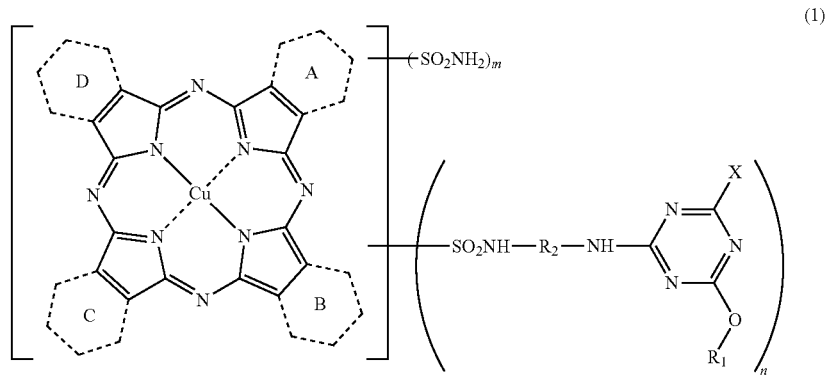

(1)

wherein rings A, B, C and D each indicated by a broken line are, independently of one another, a benzene ring or a nitrogen-containing heteroaromatic ring, the number of the nitrogen-containing heteroaromatic ring is more than 0.0 and 3.0 or less, the remainder is the benzene ring, $R_1$ is an alkyl group, $R_2$ is an alkylene group, X is an anilino group having one or more sulfonic groups, with the proviso that X may have one or more substituents selected from the group consisting of a carboxy group, a phosphoric group, a hydroxy group, an alkoxy group, an alkylcarbonylamino group, a ureido group, a nitro group and a halogen atom, m is more than 0.0 and less than 3.9, n is 0.1 or more and less than 4.0, and the sum of m and n is 1.0 or more and less than 4.0.

In the general formula (1), the number of the nitrogen atom contained as a ring forming atom in the nitrogen-containing heteroaromatic ring of the rings A, B, C and D each indicated by the broken line is generally 1 or 2, preferably 1. As specific examples of the nitrogen-containing heteroaromatic ring, pyridine containing one nitrogen atom as well as pyrazine, pyridazine and pyrimidine containing two nitrogen atoms may be mentioned. Among these, the pyridine ring is particularly favorable.

No particular limitation is imposed on a fused ring position of the nitrogen-containing heteroaromatic ring with the porphyrazine ring. For example, when the nitrogen-containing heteroaromatic ring of the rings A, B, C and D is a pyridine ring and the position of the nitrogen atom is regarded as position 1, a fused ring is favorably formed at positions 2 and 3 or positions 3 and 4, particularly favorably at positions 3 and 4. The number of the nitrogen-containing heteroaromatic ring of the rings A, B, C and D is more than 0.0 and 3.0 or less, favorably 0.2 or more and 2.0 or less, more favorably 0.5 or more and 1.7 or less, particularly favorably 0.7 or more and 1.5 or less. The remainder of the rings A, B, C and D is the benzene ring. The number of the benzene ring of the rings A, B, C and D is 1.0 or more and less than 4.0, favorably 2.0 or more and 3.8 or less, more favorably 2.3 or more and 3.5 or less, particularly favorably 2.5 or more and 3.3 or less.

Incidentally, in the present specification, the number of the nitrogen-containing heteroaromatic ring is described by rounding off to one decimal place unless expressly noted. However, when the number of the pyridine ring is 1.35, the number of the benzene ring is 2.65, and both are rounded off to one decimal place, the former is 1.4, the latter is 2.7, and the total of both becomes larger than 4.0 of the total of the rings. In such a case, the number of the nitrogen-containing heteroaromatic ring is omitted below two decimal places for the sake of convenience, only the number of the benzene ring is rounded off, and thus the former and the latter are described as 1.3 and 2.7, respectively. In addition, m and n in the general formula (1) are also described by rounding off to one decimal place in principle. However, when the total of both of them exceeds the theoretical value, m is omitted below two decimal places, and only n is rounded off to express them.

As the alkyl group indicated by $R_1$ in the general formula (1) includes a linear, branched or cyclic alkyl group. Among these, a linear or branched alkyl group is favorable, and a linear alkyl group is more favorable. The number of carbon atoms in the alkyl group is generally 1 or more and 6 or less, favorably 1 or more and 4 or less, more favorably 1 or more and 3 or less. As specific examples of the alkyl group, linear alkyl groups such as methyl, ethyl, n-propyl, n-butyl and n-pentyl, n-hexyl; branched alkyl groups such as isopropyl, isobutyl, sec-butyl, t-butyl, isopentyl and isohexyl; and cyclic alkyl groups such as cyclopropyl, cyclobutyl, cyclopentyl and cyclohexyl may be mentioned. Among these, a methyl, ethyl or isopropyl group is favorable, a methyl or ethyl group is more favorable, and a methyl group is particularly favorable.

The alkylene group indicated by $R_2$ in the general formula (1) includes a linear, branched or cyclic alkylene group. Among these, a linear or branched alkylene group is favorable, and a linear alkylene group is more favorable. The number of carbon atoms in the alkylene group is generally 2 or more and 12 or less, favorably 2 or more and or less, more favorably 2 or more and 4 or less, particularly favorably 2 or more and 3 or less. As specific examples of the alkylene group, linear alkylene groups such as ethylene, propylene, butylene, pentylene, hexylene, heptylene, octylene, nonylene, decylene, undecylene and dodecylene; branched alkylene groups such as 2-methylethylene; and cyclic alkylene groups such as cyclopropylenediyl, 1,2- or 1,3-cyclopentylenediyl and 1,2-, 1,3- or 1,4-cyclohexylenediyl may be mentioned. Among these, a methylene, ethylene or propylene group is favorable, an ethylene or propylene group is more favorable, and an ethylene group is particularly favorable.

The anilino group having one or more sulfonic groups, indicated by X in the general formula (1) includes an anilino group having generally one to three, favorably one or two, more favorably two sulfonic groups. As specific examples of the anilino group having one or more sulfonic groups, anilino groups having one sulfonic group, such as 2-sulfoanilino, 3-sulfoanilino and 4-sulfoanilino; anilino groups having two sulfonic groups, such as 2,3-disulfoanilino, 2,4-disulfoanilino, 2,5-disulfoanilino, 3,4-disulfoanilino and 3,5-disulfoanilino; and anilino groups having three sulfonic groups, such as 2,3,4-trisulfoanilino, 2,3,5-trisulfoanilino, 2,3,6-trisulfoanilino and 3,4,5-trisulfoanilino may be mentioned. Among these, a 2,5-disulfoanilino group is particularly favorable.

When the anilino group having one or more sulfonic groups, indicated by X in the general formula (1) further has another substituent than the sulfonic group, the number of another substituent than the sulfonic group is generally 1 or 2, favorably 1. The kind of the substituent may be either single or plural. As examples of another substituent than the sulfonic group, a carboxy group, a phosphoric group, a hydroxy group, an alkoxy group, an alkylcarbonylamino group, an ureido group, a nitro group and a halogen atom may be mentioned. Specific examples of another substituent than the sulfonic group that the anilino group having one or more sulfonic groups, indicated by X may have are mentioned below.

The alkoxy group includes a linear, branched or cyclic alkoxy group. A linear or branched alkoxy group is favorable, and a linear alkoxy group is more favorable. The number of carbon atoms in the alkoxy group is generally 1 or more and 6 or less, favorably 1 or more and 4 or less, more favorably 1 or more and 3 or less. As specific examples of the alkoxy group, linear alkoxy groups such as methoxy, ethoxy, n-propoxy, n-butoxy, n-pentoxy and n-hexyloxy; branched alkoxy groups such as isopropoxy, isobutoxy, sec-butoxy, t-butoxy, isopentyloxy and isohexyloxy; and cyclic alkoxy groups such as cyclopropoxy, cyclopentoxy and cyclohexyloxy may be mentioned. Among these, a methoxy, ethoxy or isopropoxy is favorable, and a methoxy group is more favorable.

The alkylcarbonylamino group includes a linear or branched alkylcarbonylamino group, and a linear alkylcarbonylamino group is favorable. The number of carbon atoms in an alkyl portion of this alkylcarbonylamino group is generally 1 or more and 6 or less, favorably 1 or more and 4 or less, more favorably 1 or more and 3 or less. As specific examples of the alkylcarbonylamino group, linear alkylcarbonylamino groups such as methylcarbonylamino (acetylamino), ethylcarbonylamino, n-propylcarbonylamino and n-butylcarbonylamino; and branched alkylcarbonylamino groups such as isopropylcarbonylamino may be mentioned. Among these, an acetylamino group is favorable.

The ureido group includes an unsubstituted ureido group, an alkylureido group or an arylureido group. As specific examples of the alkylureido group, alkylureido groups such as methylureido, ethylureido, N,N-dimethylureido and N,N-dibutylureido; and arylureido groups such as phenylureido may be mentioned. Among these, an unsubstituted ureido group is favorable.

The halogen atom includes a fluorine atom, a chlorine atom, a bromine atom or an iodine atom. Among these, a chlorine atom is favorable.

m, n and the sum of m and n in the general formula (1) are each an average value. m indicates the substitution number of the unsubstituted sulfamoyl group and is more than 0.0 and less than 3.9. n indicates the substitution number of the substituted sulfamoyl group and is 0.1 or more and less than 4.0. The sum of m and n is 1.0 or more and less than 4.0. When the number of the nitrogen-containing heteroaromatic ring of the rings A, B, C and D is 0.2 or more and 2.0 or less and the number of the benzene ring is 2.0 or more and 3.8 or less, it is favorable that m is 1.8 or more and 3.6 or less, n is 0.2 or more and 2.0 or less, and the sum of m and n is 2.0 or more and 3.8 or less. When the number of the nitrogen-containing heteroaromatic ring of the rings A, B, C and D is 0.3 or more and 1.5 or less and the number of the benzene ring is 2.5 or more and 3.7 or less, it is favorable that m is 2.2 or more and 3.0 or less, n is 0.3 or more and 1.5 or less, and the sum of m and n is 2.5 or more and 3.7 or less. In addition, when the number of the nitrogen-containing heteroaromatic ring of the rings A, B, C and D is 0.5 or more and 1.2 or less and the number of the benzene ring is 2.8 or more and 3.5 or less, it is favorable that m is 2.1 or more and 3.1 or less, n is 0.4 or more and 1.4 or less, and the sum of m and n is 2.8 or more and 3.5 or less.

Since the aggregation property of the compound represented by the general formula (1) tends to become high as the value m increases, the ozone resistance of an image recorded tends to be improved, while a bronzing phenomenon tends to easily occur. Thus, it is favorable that the values m and n are suitably adjusted while taking the ozone resistance and bronzing resistance of the image recorded into consideration to select a well-balanced ratio between them. Incidentally, the unsubstituted sulfamoyl group and the substituted sulfamoyl group whose substitution numbers are indicated by m and n, respectively, are each a group introduced into the benzene ring of the rings A, B, C and D. That is, both the unsubstituted sulfamoyl group and the substituted sulfamoyl group are not introduced into the nitrogen-containing heteroaromatic ring of the rings A, B, C and D.

The compound represented by the general formula (1) may be a free acid form (H form) or may form a salt (salt form) by an acidic group such as a sulfonic group in the molecule. As a counter ion when the salt is formed, a cation of an alkali metal; ammonia ($NH_3$); or organic ammonium may be mentioned. As specific example of the alkali metal, lithium, sodium and potassium may be mentioned. As specific examples of the organic ammonium, alkylamines having 1 to 3 carbon atoms, such as methylamine and ethylamine; mono-di- or tri-alkanolamines having 1 to 4 carbon atoms, such as monoethanolamine, diethanolamine, triethanolamine, monoisopropanolamine, diisopropanolamine and triisopropanolamine may be mentioned. Incidentally, M in a case where a compound represented by a general formula (2) which will be described subsequently is a salt form may also be selected from the above-described cations of the alkali metal; ammonia ($NH_3$); and organic ammonium.

As favorable specific examples of the salt of the compound represented by the general formula (1), a salt with an alkali metal such as sodium, potassium or lithium; a salt with a mono-, di- or tri-alkanolamine having 1 to 4 carbon atoms, such as monoethanolamine, diethanolamine, triethanolamine, monoisopropanolamine, diisopropanolamine or triisopropanolamine; and an ammonium ($NH_4^+$) salt may be mentioned.

When the compound represented by the general formula (1) is a salt form, physical natures of such a compound, such as solubility, and the performance (in particular, performance as to fastness properties of an image recorded) of an ink containing the salt as a coloring material may vary in some cases according to the kind of the counter ion of the salt. Therefore, the kind of the salt is favorably selected according to the intended performance of the resulting ink. Incidentally, in order to change the compound from the free acid form to the salt form, it is only necessary to add a material forming such a cation as mentioned above (for example, an alkali metal hydroxide) so as to adjust the pH of a liquid containing the compound into an alkaline range. In order to change the compound from the salt form to the free acid form, it is only necessary to add an acid so as to adjust the pH of a liquid containing the compound to an acidic range. In addition, in order to change a particular salt form to another salt form, it is only necessary to conduct ion exchange.

As a more favorable specific example of the first coloring material contained in the ink according to the present invention, a compound represented by the follow general formula (4) may be mentioned:

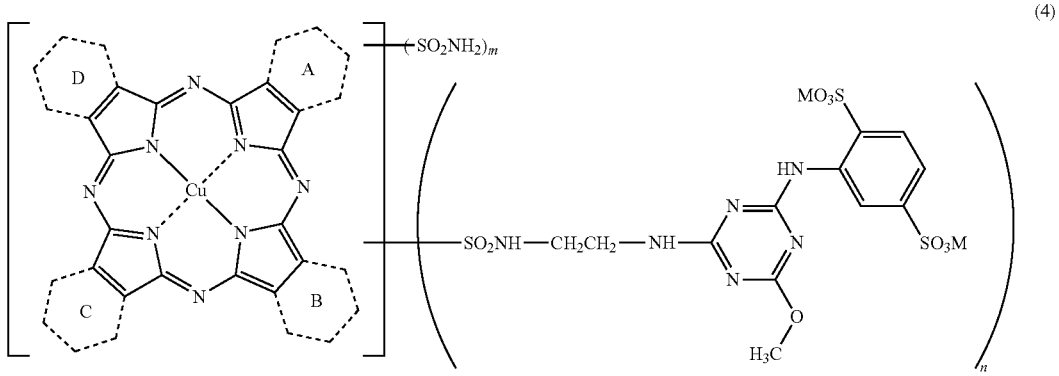

(4)

wherein rings A, B, C and D each indicated by a broken line are, independently of one another, a benzene ring or a nitrogen-containing heteroaromatic ring, the number of the nitrogen-containing heteroaromatic ring is more than 0.0 and 3.0 or less, the remainder is the benzene ring, M's are, independently of each other, a hydrogen atom, an alkali metal, ammonium or organic ammonium, m is more than 0.0 and less than 3.9, n is 0.1 or more and less than 4.0, and the sum of m and n is 1.0 or more and less than 4.0.

Favorable specific examples of the compound represented by the general formula (1) are shown in Table 1. Quite naturally, the compound represented by the general formula (1) and used as a coloring material in the ink according to the present invention is not limited to the exemplified compounds shown in Table 1 so far as such a compound is included in the structure of the general formula (1) and the definition thereof. In addition, as well known by a person skilled in the art, a phthalocyanine type porphyrazine compound such as the compound represented by the general formula (1) is generally present in a state of a mixture containing a plurality of isomers, and can exhibit the effect thereof even when used in that state. However, in the present invention, a typical one structural formula is described without distinguishing the plurality of the isomers for the sake of convenience. Incidentally, values m and n in Table 1 are expressed by rounding them off for the purpose of avoiding complication. Therefore, m in Table 1 is expressed as "0" for the sake of convenience. However, this is a problem of computation process and of course means that m in the general formula (1) is more than 0.0.

The compound represented by the general formula (1) can be synthesized by, for example, reacting a compound represented by the following general formula (II) with an organic amine represented by the following general formula (III) in the presence of ammonia or an ammonia generating source. The compound represented by the general formula (II) can be obtained by, for example, chloro-sulfonylating a compound represented by the following general formula (I):

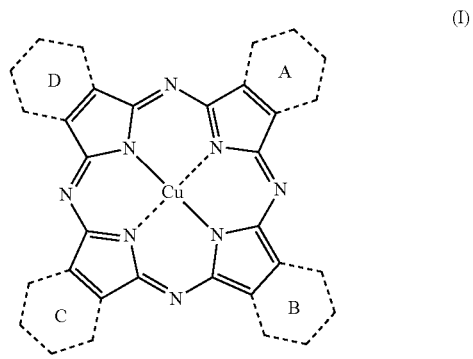

(I)

wherein rings A, B, C and D each indicated by a broken line are, independently of one another, a benzene ring or a nitrogen-containing heteroaromatic ring, the number of the nitrogen-containing heteroaromatic ring is more than 0.0 and 3.0 or less, and the remainder is the benzene ring.

TABLE 1

Exemplified compounds of the general formula (1)

| Exemplified compound | A | B | C | D | $R_2$ | X | $R_1$ | m | n |
|---|---|---|---|---|---|---|---|---|---|
| 1 | 3,4-PD | Bz | Bz | Bz | EL | 2,5-Disulfoanilino | Me | 2 | 1 |
| 2 | 3,4-PD | Bz | Bz | Bz | EL | 2,4-Disulfoanilino | Me | 2 | 1 |
| 3 | 3,4-PD | Bz | Bz | Bz | EL | 2-Sulfoanilino | Me | 2 | 1 |
| 4 | 3,4-PD | Bz | Bz | Bz | EL | 3-Sulfoanilino | Me | 2 | 1 |
| 5 | 3,4-PD | Bz | Bz | Bz | EL | 4-Sulfoanilino | Me | 2 | 1 |
| 6 | 3,4-PD | Bz | Bz | Bz | EL | 2,5-Disulfoanilino | Et | 2 | 1 |
| 7 | 3,4-PD | Bz | Bz | Bz | EL | 2,5-Disulfoanilino | i-Pr | 2 | 1 |
| 8 | 3,4-PD | Bz | Bz | Bz | EL | 4-Methoxy-2-sulfoanilino | Me | 2 | 1 |
| 9 | 3,4-PD | Bz | Bz | Bz | EL | 4-Nitro-2-sulfoanilino | Me | 2 | 1 |
| 10 | 3,4-PD | Bz | Bz | Bz | EL | 2-Chloro-5-sulfoanilino | Me | 2 | 1 |
| 11 | 3,4-PD | Bz | 3,4-PD | Bz | EL | 3-(Aminocarbonylamino)-5-sulfoanilino | Me | 1 | 1 |
| 12 | Bz | 3,4-PD | 3,4-PD | 3,4-PD | EL | 2,5-Disulfoanilino | Me | 0 | 1 |
| 13 | Bz | 3,4-PD | 3,4-PD | Bz | EL | 2,5-Disulfoanilino | Me | 1 | 1 |
| 14 | 3,4-PD | Bz | Bz | Bz | PPL | 2-Hydroxy-3-acetylamino-5-sulfoanilino | Me | 2 | 1 |
| 15 | 3,4-PD | Bz | 3,4-PD | Bz | PPL | 3-Carbonyl-4-hydroxy-5-sulfoanilino | Me | 1 | 1 |
| 16 | 3,4-PD | Bz | 3,4-PD | 3,4-PD | PPL | 3-Methyl-6-methoxy-4-sulfoanilino | Me | 0 | 1 |
| 17 | 3,4-PD | Bz | Bz | Bz | EL | 5-Phosphono-2-sulfoanilino | Me | 2 | 1 |

3,4-PD: 3,4-Pyrido (pyridine ring fused at positions 3 and 4)
Bz: Benzo
EL: Ethylene
PPL: Propylene
Me: Methyl
Et: Ethyl
i-Pr: Isopropyl.

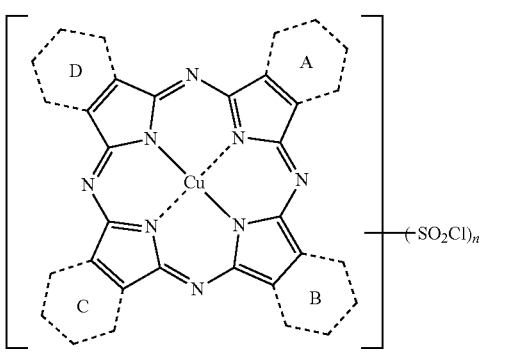

(II)

wherein rings A, B, C and D have the same meaning as the rings A, B, C and D in the general formula (I), and n is 1.0 or more and less than 4.0.

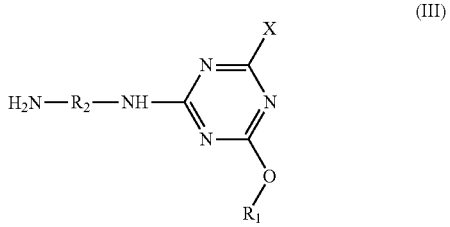

(III)

wherein $R_1$ is an alkyl group, $R_2$ is an alkylene group, and X is an anilino group having one or more sulfonic groups, with the proviso that X may have one or more substituents selected from the group consisting of a carboxy group, a phosphoric group, a hydroxy group, an alkoxy group, an alkylcarbonylamino group, a ureido group, a nitro group and a halogen atom.

The compound represented by the general formula (I) can be obtained according to a publicly known process or a process equivalent thereto. As examples of the publicly known process, may be mentioned the processes disclosed in International Publication No. 2007/091631, International Publication No. 2007/116933 and International Publication No. 2008/111635.

A favorable process for chlorosulfonylating the compound represented by the general formula (I) includes a process in which the compound represented by the general formula (I) is added to chlorosulfonic acid to conduct a reaction, and a chlorinating agent is then further added to conduct a reaction. When the compound represented by the general formula (I) is reacted with chlorosulfonic acid, a compound in which a chlorosulfonyl group and a sulfonic group have been randomly substituted is obtained, and it is thus difficult to obtain the intended compound represented by the general formula (II) with high selectivity. Therefore, it is favorable that after the compound represented by the general formula (I) is reacted with chlorosulfonic acid, a chlorinating agent is further added to convert the sulfonic group substituted to a chlorosulfonyl group.

When the compound represented by the general formula (I) is chlorosulfonylated, chlorosulfonic acid is used in an amount of generally 3 to 20 times, favorably 5 to 10 times of the mass of the compound represented by the general formula (I). The reaction temperature is generally 100° C. to 150° C., favorably 120 to 150° C. The reaction time is generally 1 to 10 hours though it varies according to conditions such as the reaction temperature.

Examples of the chlorinating agent includes thionyl chloride, sulfuryl chloride, phosphorus trichloride, phosphorus pentachloride and phosphorus oxychloride. Among these chlorinating agents, thionyl chloride is favorable. The amount of the chlorinating agent added is generally 6 to 40 mol, favorably 9 to 20 mol per mol of the compound represented by the general formula (1) though it varies according to the kind thereof. The reaction temperature is generally 30° C. to 100° C., favorably 50 to 90° C. The reaction time is generally 1 to 10 hours though it varies according to conditions such as the reaction temperature.

The organic amine represented by the general formula (III) can be synthesized according to the following process. First, 5 to 60 mol of a compound represented by "$R_1$—OH" (a monohydric alcohol), 1 mol of 2,4,6-trichloro-S-triazine (cyanuric chloride) and 0.8 to 1.2 mol of sodium hydrogencarbonate are reacted to obtain a reaction liquid containing a primary condensate. The reaction temperature is generally 5 to 70° C., and the reaction time is generally 2 to 12 hours. Incidentally, the resultant primary condensate is isolated as solids such as wet cake from the reaction liquid by a proper method such as salting out, and the thus-obtained primary condensate may also be used to the next reaction.

Then, the resultant reaction liquid containing the primary condensate or the wet cake (favorably, the reaction liquid) is added to an aqueous solution of 0.9 to 1.5 mol of aniline having one or more sulfonic groups corresponding to X. The pH of the reaction liquid is adjusted to generally 4 to 10 with an alkali metal hydroxide such as sodium hydroxide to conduct a reaction, thereby obtaining a secondary condensate. The reaction temperature is generally 5 to 80° C., favorably 5 to 40° C., and the reaction time is generally 0.5 to 12 hours.

One mol of the resultant secondary condensate is reacted with 1 to 50 mol of a compound represented by "$H_2N$—$R_2$—$NH_2$" (an alkylenediamine), whereby the organic amine represented by the general formula (III) can be obtained. The pH upon the reaction is generally 4 to 7. The reaction temperature is generally 5 to 90° C., favorably 40 to 90° C., and the reaction time is generally 0.5 to 8 hours.

An alkali metal hydroxide such as sodium hydroxide or potassium hydroxide or an alkali metal carbonate such as sodium carbonate or potassium carbonate may be used for pH adjustment upon the respective condensation reactions. Incidentally, the order of the condensation reactions may be suitably determined according to the reactivity of the compound reacted with cyanuric chloride.

The compound represented by the general formula (II) is reacted with the organic amine represented by the general formula (III) in the presence of ammonia or an ammonia generating source in, for example, water, whereby the intended compound represented by the general formula (1) can be obtained. The pH upon the reaction is generally 8 to 10. The reaction temperature is generally 5 to 70° C., favorably 5 to 40° C., and the reaction time is generally 1 to 20 hours. As ammonia, aqueous ammonia or a water-miscible organic solvent containing ammonia gas may be used. As specific examples of a water-soluble organic solvent used in the preparation of the water-miscible organic solvent containing ammonia gas, dimethylformamide and dimethylacetamide may be mentioned. The aqueous ammonia or water-miscible organic solvent containing ammonia gas includes that prepared by a publicly known method such as blowing of ammonia gas into water or a water-soluble organic solvent, or a commercially available product.

As the ammonia generating source, a chemical substance which generates ammonia by neutralization or decomposition may be used. As examples of such a chemical substance, ammonium salts which generate ammonia by neutralization, such as ammonium chloride and ammonium sulfate; and substances which generate ammonia by thermal decomposition, such as urea may be mentioned. Among these, ammonia is favorably used in the form of aqueous ammonia. In particular, concentrated aqueous ammonia available as a commercial product (marketed as about 28% by mass aqueous ammonia) or aqueous ammonia obtained by diluting this concentrated aqueous ammonia with water as needed is favorably used. Further, the use of the concentrated aqueous ammonia is favorable because the amount of the reaction liquid can be lessened.

The amount of the organic amine represented by the general formula (III) used is generally about 1 molar equivalent of a theoretical value (the calculated moles of the organic amine represented by the general formula (III) that are required to obtain the intended value for n in the general formula (1)) with respect to one mole of the compound represented by the general formula (II). However, the amount is suitably adjusted according to the reactivity of the organic amine and reaction conditions and is generally 1 to 3 molar equivalents, favorably 1 to 2 molar equivalents of the theoretical value.

When the compound represented by the general formula (II) is reacted with the organic amine represented by the general formula (III) in water, it is theoretically considered that a part of the chlorosulfonyl group in the general formula (II) is hydrolyzed into a sulfonic group. That is, it is theoretically considered that a compound with a part of the "—SO$_2$NH$_2$" group in the general formula (1) converted to a sulfonic group is mingled in the intended compound represented by the general formula (1). However, it is generally difficult to distinguish the "—SO$_2$NH$_2$" group from the sulfonic group by mass analysis that is one of general analyzing methods for the phthalocyanine type porphyrazine compound. From such a reason, in the present specification, other chlorosulfonyl groups in the general formula (II) than that reacted with the organic amine represented by the general formula (III) are all expressed as being converted to the "—SO$_2$NH$_2$" group.

Examples of a method for isolating the compound represented by the general formula (1) from the reaction liquid in the final step of the above-described synthetic process include methods such as acid deposition (a method of depositing a compound by adding an acid), salting out and acidic salting out to combine them. The salting out is favorably conducted in an acidic to alkaline range, more favorably in a range of pH 1 to 11. No particular limitation is imposed on the temperature upon the salting out. However, the reaction liquid is heated to generally 40 to 80° C., favorably 40 to 60° C. After the heating, for example, sodium chloride is favorably added to conduct the salting out. A favorable method for isolating the compound represented by the general formula (1) is such an acidic salting out process that salting out is conducted under very acidic conditions of pH 1.

T The phthalocyanine type porphyrazine compound is classified into three kinds of compounds: α-position substitution form, β-position substitution form and α-position and β-position mixed substitution form, according to the substitution position of the substituent. The compound represented by the general formula (1) has a particular number (indicated as an average value) of benzene rings for the rings A, B, C and D. Therefore, the compound represented by the general formula (1) may also be classified into three kinds of substitution forms according to the substitution position of the substituent of the benzene ring like the phthalocyanine type porphyrazine compound. The compound represented by the general formula (1) may be classified into the α-position and β-position mixed substitution form.

Second Coloring Material

The second coloring material to be combined with the compound represented by the general formula (1) used as the first coloring material is a compound represented by the following general formula (2). Since the compound represented by the general formula (2) is also a phthalocyanine compound like the compound represented by the general formula (1), it is normally present as a mixture. The compound is represented by the general formula (2) as a structure of a typical example of the mixture for the sake of convenience, and the numbers of the respective rings and substituents are indicated as average values thereof.

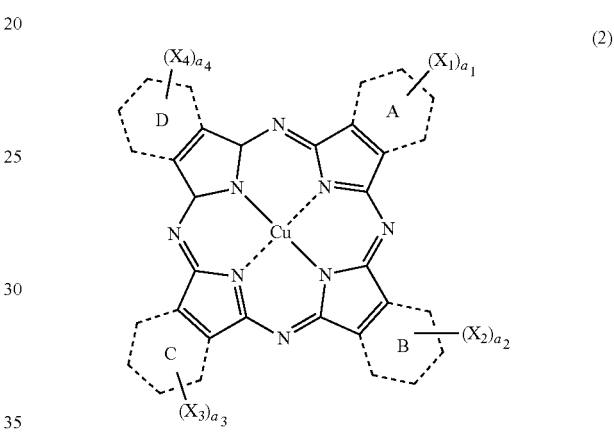

(2)

wherein rings A, B, C and D each indicated by a broken line are, independently of one another, a benzene ring or a nitrogen-containing heteroaromatic ring, $X_1$, $X_2$, $X_3$ and $X_4$ are, independently of one another, —SO—Z, —SO$_2$—Z, —SO$_2$NR$_1$R$_2$, —SO$_3$M, —CONR$_1$R$_2$ or —CO$_2$R$_1$, $a_1$, $a_2$, $a_3$ and $a_4$ are respective numbers of substituents of $X_1$, $X_2$, $X_3$ and $X_4$ and are, independently of one another, 1.0 or more and 2.0 or less, Z is a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, $R_1$ and $R_2$ are, independently of each other, a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, M is a hydrogen atom, an alkali metal, ammonium or organic ammonium, and at least one of $X_1$, $X_2$, $X_3$ and $X_4$ is a group represented by the following general formula (3):

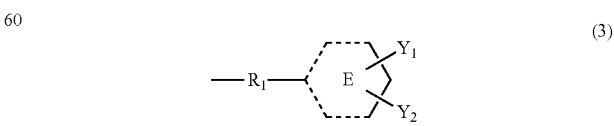

(3)

wherein a ring E indicated by a broken line is a benzene ring or a nitrogen-containing heteroaromatic ring, $R_1$ is a linking group containing an atom selected from the group consisting of sulfur, nitrogen, oxygen and carbon in a main chain thereof and linking the phthalocyanine ring to the ring E indicated by the broken line by a covalent bond, and $Y_1$ and $Y_2$ are, independently of each other, a hydrogen atom, a halogen atom, an alkyl group, an aryl group, a cyano group, an alkoxy group, an amide group, a ureido group, a sulfonamide group, a carbamoyl group, a sulfamoyl group, an alkoxycarbonyl group, a carboxy group, a sulfonic group, an amino group or a substituted or unsubstituted anilino group.

A phthalocyanine compound is also used as the second coloring material to be combined with the first coloring material that is a phthalocyanine compound, whereby the occurrence of the bronzing phenomenon can be inhibited, and moreover an image excellent in ozone resistance can be recorded. Phthalocyanine compounds generally exhibit small changes in an absorption spectrum in a visible light region due to a difference in substituents. Therefore, the use of the phthalocyanine compound is expected to improve fastness properties including ozone resistance compared with the use of a triphenylmethane compound that is a non-phthalocyanine compound. On the other hand, a triphenylmethane compound having a non-phthalocyanine structure is used as the second coloring material, the ozone resistance becomes low. The effect of the second coloring material used in the present invention resides in that the occurrence of the bronzing phenomenon is inhibited without impairing the ozone resistance of an image recorded. Thus, in the present invention, the phthalocyanine compound having a phthalocyanine structure as a basic skeleton is used as the second coloring material.

The present inventors presume the reason why it is necessary to use the compound represented by the general formula (2) as the second coloring material to be as follows. Since the phthalocyanine compound is high in the planarity of a phthalocyanine ring, the compound tends to easily aggregate by an interaction between the phthalocyanine rings. Thus, when an ink containing the phthalocyanine compound is used, the fastness properties of an image recorded, such as ozone resistance, are improved, while there is a tendency for the compound to aggregate in excess to easily cause the bronzing phenomenon. Therefore, the phthalocyanine compound having a structure different from the first coloring material is further used as the second coloring material, whereby aggregation between compounds can be reduced rather than the single use of the first coloring material relatively high in aggregation property as a coloring material of an ink. At this time, the use of a compound represented by the general formula (2) into which the ring E in the general formula (3), that is, a bulky structure such as an aromatic ring or a nitrogen-containing heteroaromatic ring, has been introduced through the linking group $R_1$ can suppress the aggregation of the phthalocyanine compound.

The compound represented by the general formula (2) exhibits such an effect that an interaction between phthalocyanine rings is moderately reduced by introducing the substituent having a bulky structure thereinto to adjust the degree of aggregation so as to reduce the occurrence of the bronzing phenomenon while retaining the ozone resistance. The action of the linking group $R_1$ resides in that a bulky structure such as the ring E in the general formula (3) is effectively arranged to sufficiently ensure a free volume thereof, thereby reducing the aggregation of the compound. The second coloring material having such properties is used in combination with the first coloring material, whereby an ink capable of recording an image improved in bronzing resistance while satisfying the ozone resistance can be obtained. On the other hand, when such a phthalocyanine compound which does not have a substituent having a bulky structure as described in Japanese Patent Application Laid-Open No. 2004-002670 is used in combination with the first coloring material, an image excellent in bronzing resistance cannot be recorded.

In order to effectively exhibit the effect of the substituent having the bulky structure, it is favorable to suitably set the structure of the linking group represented by $R_1$. Specifically, the length of a main chain of the linking group represented by $R_1$ is favorably a length of 5 atoms or more. Here, the main chain is composed of atoms selected from the group consisting of sulfur, nitrogen, oxygen and carbon and means a structure between the phthalocyanine skeleton and the ring E. Incidentally, since the linking group is what is called a non-chromophoric group which does not contribute to color development, the main chain of the linking group represented by $R_1$ may be long so far as color developability is not so lowered. However, the length of the main chain is favorably a length of 10 atoms or less.

As specific examples of the structure making up the main chain of the linking group represented by $R_1$, —SO—, —SO$_2$—, —SO$_2$N<, —CO$_2$—, —N< and —C$_n$H$_{2n}$— (n is a number of 1 or more and 6 or less) may be mentioned. The main chain may contain a plurality of these structures in any combination thereof.

As examples of a process for introducing the group represented by general formula (3) into the phthalocyanine ring, may be mentioned (i) a process in which a sulfonating agent such as sulfuring acid is caused to act to introduce a sulfonic group into the phthalocyanine ring, the sulfonic group is converted to a chlorosulfonic group, and the resultant compound is then reacted with an amine derivative; and (ii) a process in which a carboxy group is introduced into the phthalocyanine ring, and the resultant compound is then condensed with an alcohol. In addition, a process in which a reaction for forming the phthalocyanine ring is conducted by using a raw material into which a structure corresponding to the group represented by the general formula (3) has been introduced in advance may also be mentioned.

As specific examples of the second coloring material, the compounds described in Japanese Patent Application Laid-Open No. 2004-323605, International Publication No. 2004/087815 and International Publication No. 2007/091631 may be mentioned.

A compound represented by the following general formula (5) is favorable as the second coloring material because color developability can be enhanced while improving the ozone resistance and bronzing resistance of an image recorded, and a compound represented by the following general formula (6) is particularly favorable. The compounds represented by the following general formulae (5) and (6) can be synthesized according to the processes described in Japanese Patent Application Laid-Open No. 2004-323605, International Publication No. 2004/087815 and International Publication No. 2007/091631.

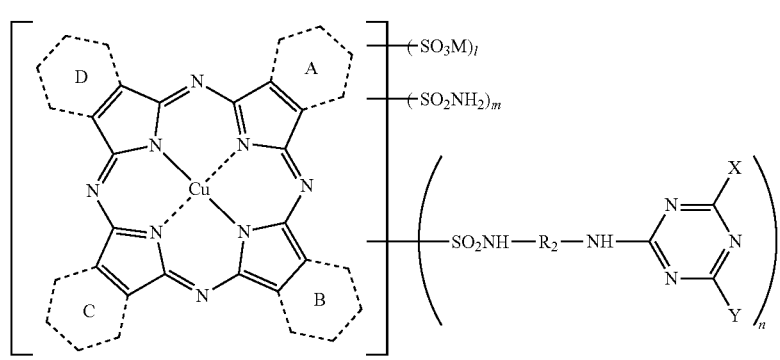

(5)

wherein rings A, B, C and D are, independently of one another, a 6-membered ring having an aromatic nature, M is a hydrogen atom, an alkali metal, ammonium or organic ammonium, $R_2$ is an alkylene group, X is a sulfonic-group-substituted anilino group, a carboxy-group-substituted anilino group or a phosphonic-group-substituted anilino group, Y is a hydroxy group or an amino group, l is 0.0 or more and 2.0 or less, m is more than 0.0 and 3.0 or less, n is 0.1 or more and 3.0 or less, the sum of l, m and n is 1.0 or more and 4.0 or less, and X may further have 0 to 4 substituents selected from the group consisting of a sulfonic group, a carboxy group, a phosphonic group, a sulfamoyl group, a carbamoyl group, a hydroxy group, an alkoxy group, an amino group, an alkylamino group, a dialkylamino group, an arylamino group, a diarylamino group, an acetylamino group, a ureido group, an alkyl group, a nitro group, a cyano group, a halogen atom, an alkylsulfonyl group and an alkylthio group.

Content of Coloring Material

The content (% by mass) of the first coloring material in the ink is favorably 0.01% by mass or more and 10.0% by mass or less based on the total mass of the ink. The content (% by mass) of the second coloring material in the ink is favorably 0.01% by mass or more and 10.0% by mass or less based on the total mass of the ink. No particular limitation is imposed on the total content (% by mass) of the first coloring material and the second coloring material in the ink so far as it falls within a range satisfying reliability as an ink jet ink, such as ejection properties. However, the total content (% by mass) is favorably 0.01% by mass or more and 10.0% by mass or less.

The content (% by mass) of the first coloring material based on the total mass of the ink is favorably 0.4 times or more and 4.0 times or less in terms of mass ratio with respect to the content (% by mass) of the second coloring material. That is, "Content (% by mass) of first coloring material"/"Content (% by mass) of second coloring material" is favorably 0.4 times

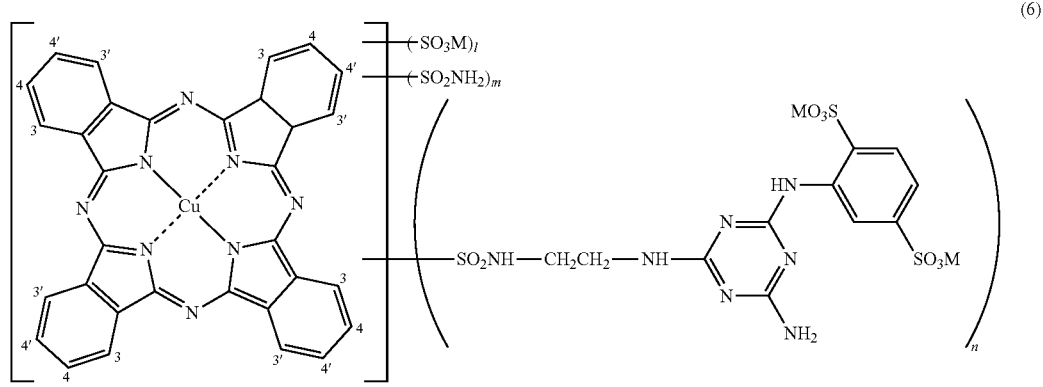

(6)

wherein M's are, independently of each other, a hydrogen atom, an alkali metal, ammonium or organic ammonium, l is 0.0 or more and 2.0 or less, m is 1.0 or more and 3.0 or less, n is 1.0 or more and 3.0 or less, the sum of l, m and n is 2.0 or more and 4.0 or less, and the substituent is introduced into at least one of positions 3 and 3' in one or more benzene rings constituting the phthalocyanine ring.

The second coloring material may also be a free acid form (H form) or may also form a salt (salt form) by an acidic group such as a sulfonic group in the molecule like the first coloring material. As a counter ion when the salt is formed, the same ion as in the compound represented by the general formula (1) may be mentioned.

or more and 4.0 times or less. If the mass ratio is less than 0.4 times, the effect to improve the ozone resistance by the first coloring material is not sufficiently exhibited, and so the ozone resistance of the image may not be sufficiently achieved in some cases. If the mass ratio is more than 4.0 times on the other hand, the effect to reduce the occurrence of the bronzing phenomenon by the second coloring material is not sufficiently exhibited, and so the bronzing resistance of the image may not be sufficiently achieved in some cases.

Verification Method of Coloring Material

In order to verify whether the coloring material used in the present invention is contained in the ink or not, the following verification methods (1) to (3) using high performance liquid chromatography (HPLC) can be applied.

(1) Retention time of a peak,
(2) Maximum absorption wavelength for the peak in (1), and
(3) M/Z (posi) and M/Z (nega) of a mass spectrum for the peak in (1).

Aqueous Medium

An aqueous solvent that is water or a mixed solvent of water and a water-soluble organic solvent may be used in the ink according to the present invention. Deionized water (ion-exchanged water) is favorably used as the water. The content (% by mass) of water in the ink is favorably 10.0% by mass or more and 90.0% by mass or less based on the total mass of the ink.

No particular limitation is imposed on the water-soluble organic solvent so far as the solvent is soluble in water, alcohols, polyhydric alcohols, polyglycols, glycol ethers, nitrogen-containing polar solvents and sulfur-containing polar solvents may be used. The content (% by mass) of the water-soluble organic solvent in the ink is favorably 5.0% by mass or more and 90.0% by mass or less, more favorably 10.0% by mass or more and 50.0% by mass or less, based on the total mass of the ink. If the content of the water-soluble organic solvent is below or beyond the above-described range, the ejection stability of the resulting ink may not be sufficiently achieved at a high level in some cases.

Other Additives

The ink according to the present invention may contain a water-soluble organic compound which is solid at ordinary temperature, such as a polyhydric alcohol such as trimethylolpropane or trimethylolethane, urea, or a urea derivative such as ethyleneurea, in addition to the above-described components as needed. In addition, the ink according to the present invention may also contain various additives such as a surfactant, a pH adjustor, a rust preventive, a preservative, a mildewproofing agent, an antioxidant, an anti-reducing agent, an evaporation accelerator, a chelating agent and a water-soluble polymer as needed.

The ink according to the present invention favorably has proper physical property values because the ink is applied to an ink jet system. Therefore, the surface tension of the ink at 25° C. is favorably 10 mN/m or more and 60 mN/m or less, more favorably 20 mN/m or more and 60 mN/m or less, particularly favorably 30 mN/m or more and 40 mN/m or less. The viscosity of the ink at 25° C. is favorably 1.0 mPa·s or more and 5.0 mPa·s or less, more favorably 1.0 mPa·s or more and 3.0 mPa·s or less.

Other Inks

In order to record a full-color image, the ink according to the present invention may be used in combination with other inks having a hue different from the ink according to the present invention. As examples of the other inks, may be mentioned at least one ink selected from the group consisting of black, cyan, magenta, yellow, red, green and blue inks. What is called a light color ink having substantially the same hue as such an ink may also be further used in combination. Coloring materials used in the other inks and light color ink may be publicly known dyes or newly synthesized dyes.

Ink Cartridge

The ink cartridge according to the present invention is provided with an ink and an ink storage portion storing this ink. The ink stored in the ink storage portion is the above-described ink according to the present invention. FIG. 1 is a sectional view schematically illustrating an ink cartridge according to an embodiment of the present invention. As illustrated in FIG. 1, an ink supply port 12 for supplying an ink to a recording head is provided in a bottom of the ink cartridge. The interior of the ink cartridge is the ink storage portion storing the ink. The ink storage portion is made up by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method

The ink jet recording method according to the present invention is a method of ejecting the above-described ink according to the present invention by a recording head of an ink jet system to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly favorably adopted. Steps of the ink jet recording method may be those publicly known except that the ink according to the present invention is used.

Figure 2A:
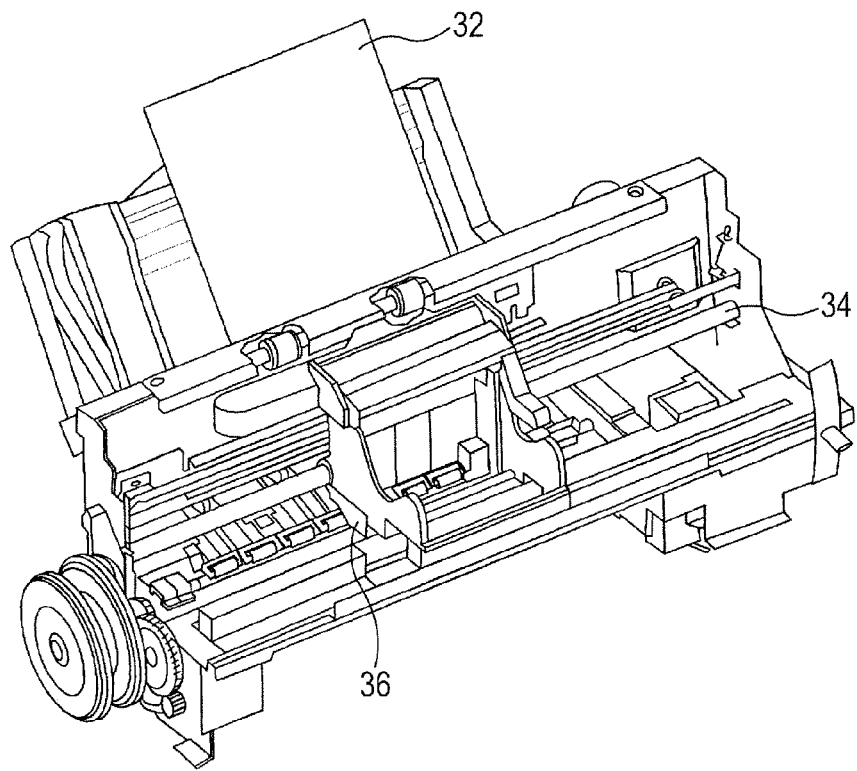
Figure 2B:
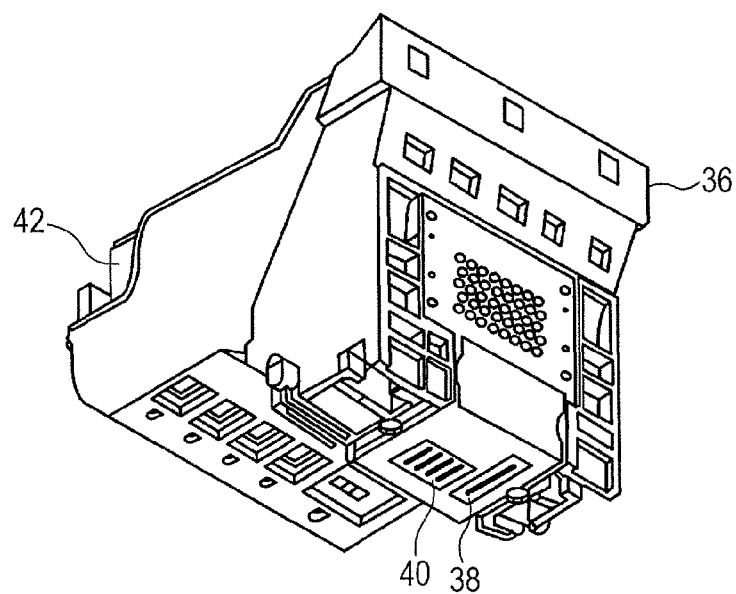

FIGS. 2A and 2B schematically illustrate an exemplary ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

EXAMPLES

The present invention will hereinafter be described in more detail by the following Examples and Comparative Examples. However, the present invention is not limited by the following examples unless going beyond the gist of the present invention. Incidentally, all designations of "part" or "parts" and "%" as to amounts of components described below are based on mass unless expressly noted.

Synthesis of Coloring Material

Although all compounds obtained by a synthetic process described below and represented by the general formula (1) are mixtures containing a plurality of isomers, such a mixture containing a plurality of isomers is described as "compound" unless expressly noted. That is, "compound" contains regioisomers of the compound; regioisomers in terms of the position of the nitrogen atom in the nitrogen-containing heteroaromatic ring, isomers in which the ratio (benzene ring)/(nitrogen-containing heteroaromatic ring) as indicated by the rings A, B, C and D in the general formula (1) differs, and α/β regioisomers on the benzene ring of the substituted or unsubstituted sulfamoyl group. As described above, it is extremely difficult to isolate a specific compound from a mixture of these isomers and determine the structure thereof, and so an example among possible isomers is taken as a representative example for the sake of convenience, and the structural formula thereof is described. In addition, the numbers of the benzene ring and the nitrogen-containing heteroaromatic ring, and the substitution numbers (m, n and the sum of m and n) are each indicated as an average value.

With respect to the compounds obtained according to the synthetic process described below, mass analysis, ICP emission spectrometry and absorbance measurement were conducted to determine the structures thereof. Incidentally, respective operations such as a reaction and crystallization were conducted under stirring unless expressly noted. In addition, "LEOCOL" used in a synthetic reaction is a surfactant (trade name "LEOCOL TD-90", product of Lion Corporation). A maximum absorption wavelength ($\lambda_{max}$) is a measured value measured in an aqueous solution of pH 6 to 9, and an aqueous solution of sodium hydroxide was used for pH adjustment. Incidentally, when a necessary amount of an intended compound was not obtained by one run of synthesis, the same operation was repeated until the necessary amount of the intended compound was obtained.

Mass Analysis

With respect to the respective compounds synthesized, mass analysis was conducted under the following conditions.
Ionization method: EI method
Mass analyzer: Trade name "SSQ-7000" (manufactured by Thermo Quest Co., Ltd.)
Ion source temperature: 230° C.
Degree of vacuum: About 8 mTorr.

ICP Emission Spectrometry

With respect to respective compounds containing copper, the content of copper was analyzed according to ICP emission spectrometry. Specifically, the analysis was conducted in the following manner. After about 0.1 g of an analytical sample was precisely weighed, and this sample was dissolved in pure water, the resultant solution was quantified in a 100-ml messflask. After 1 ml of this solution was taken to put it in a 50-ml messflask by means of a whole pipette, a fixed amount of Y (yttrium) was further added as an internal standard substance. After the volume of the solution was quantified to 50 mL with pure water, the content of copper in the solution was determined by the ICP emission spectrometry. Incidentally, an ICP emission spectrometer (trade name "SPS3100", manufactured by SII Nano Technology Inc.) was used as the analytical apparatus.

Absorbance Measurement

With respect to the respective compounds synthesized, the absorbance was measured. Measuring conditions of the absorbance are shown below.
Spectrophotometer: Automatic recording spectrophotometer (trade name "U-3300", manufactured by Hitachi Ltd.)
Measuring cell: 1-cm quartz cell
Sampling interval: 0.1 nm
Scanning speed: 30 nm/min
Number of measurements: 5 times on the average.

Synthesis of Compound A
Synthesis of Compound (a-1)

To 400 parts of sulfolane were added 44.4 parts of phthalic anhydride, 16.7 parts of cinchomeronic acid, 144 parts of urea, 13.4 parts of copper(II) chloride and 2.0 parts of ammonium molybdate, and the resultant mixture was heated to 200° C. to conduct a reaction for 5 hours at the same temperature. After completion of the reaction, the resultant reaction liquid was cooled to 65° C., 80 parts of DMF (N,N-dimethylformamide) was added, and solids deposited were separated by filtration. The resultant solids were washed with 220 parts of DMF to obtain 112.1 parts of a wet cake. After the resultant wet cake was added to 340 parts of DMF and heated to 110° C., and stirring was conducted for 1 hour at the same temperature, solids were separated by filtration and washed with 300 parts of water to obtain a wet cake. After the resultant wet cake was added to 300 parts of 5% hydrochloric acid and heated to 60° C., and stirring was conducted for 1 hour at the same temperature, solids were separated by filtration and washed with 300 parts of water to obtain a wet cake. After the resultant wet cake was added to 300 parts of 5% aqueous ammonia, and the resultant mixture was stirred for 1 hour at 60° C., solids were separated by filtration and washed with 300 parts of water to obtain 138.2 parts of a wet cake. The resultant wet cake was dried at 80° C. to obtain 46.3 parts of Compound (a-1) as blue solids.

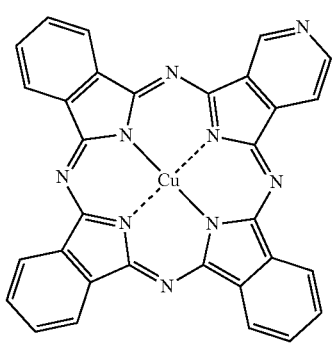

(a-1)

Synthesis of Compound (a-2)

After Compound (a-1) was gradually added to 46.2 parts of chlorosulfonic acid at room temperature so as not to exceed 60° C., a reaction was conducted for 4 hours at 140° C. to obtain a reaction liquid. After the resultant reaction liquid was cooled to 70° C., 17.9 parts of thionyl chloride was added dropwise over 30 minutes, and a reaction was conducted additionally for 3 hours at 70° C. After a reaction liquid was cooled to a temperature not higher than 30° C., the reaction liquid was slowly poured into 800 parts of iced water, solids deposited were separated by filtration and washed with 200 parts of cold water to obtain 33.0 parts of a wet cake of Compound (a-2).

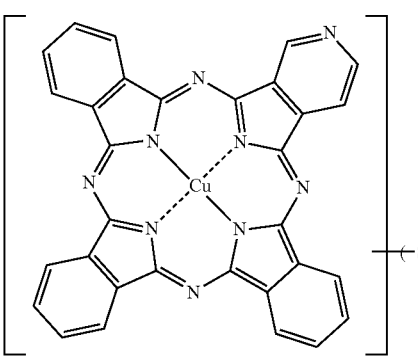

(a-2)

Synthesis of Compound (a-3)

To 160 parts of methanol were added 36.8 parts of cyanuric chloride, 4 parts of LEOCOL and 16.8 parts of sodium hydrogencarbonate, and a reaction was conducted for 1 hour at a temperature not higher than 30° C. to obtain a reaction liquid containing a primary condensate. To 280 parts of water were added 56.1 parts of 2,5-disulfoaniline and 32 parts of a 25% aqueous solution of sodium hydroxide, thereby adjusting a pH to 3 to 5. The reaction liquid containing the primary condensate obtained in the above-described manner was gradually added to this liquid, and a reaction was further conducted overnight while adjusting the pH to 6 to 7 with a 25% aqueous solution of sodium hydroxide, thereby obtaining a reaction liquid containing a secondary condensate. After 360 parts of hydrochloric acid and 125 parts of iced water were added to the resultant reaction liquid, and the resultant mixture was cooled to 0° C., 120 parts of ethylenediamine was further added dropwise. A reaction was conducted for 2.5 hours at 80° C. while adjusting the pH to 5 to 7 by adding a 25% aqueous solution of sodium hydroxide to the resultant liquid, thereby obtaining a reaction liquid containing a tertiary condensate.

The pH was adjusted to 1.0 by adding 55 parts of hydrochloric acid to the resultant reaction liquid. The amount of the liquid at this time was 1,000 parts. To the resultant liquid 200 parts of sodium chloride was added, stirring was conducted for 30 minutes, and solids deposited were separated by filtration to obtain 183 parts of a wet cake. The resultant wet cake was added to 1,000 parts of water, and the pH was adjusted to 9.0 with a 25% aqueous solution of sodium hydroxide to obtain a liquid. The pH was adjusted to 1.0 by adding 55 parts of hydrochloric acid to the resultant liquid. The amount of the liquid at this time was 1,400 parts. To this liquid was added 280 parts of sodium chloride, stirring was conducted for 30 minutes at room temperature and additionally for 30 minutes at 0° C., and solids deposited were separated by filtration to obtain 60 parts of a wet cake. The resultant wet cake was added to a mixed liquid of 224 parts of methanol and 56 parts of water to prepare a suspension. After the suspension was stirred for 1 hour at 50° C., solids were separated by filtration to obtain a 51.3 parts of a wet cake. The resultant wet cake was dried to obtain 37.0 parts of Compound (a-3) as white powder.

Synthesis of Compound A

To 120 parts of iced water 33.0 parts of the wet cake of Compound (a-2) was added, and stirring was conducted for 10 minutes at a temperature not higher than 5° C. to obtain a suspension. On the other hand, 2.1 parts of the white powder of Compound (a-3) was dissolved in a mixed liquid of 1 part of 28% aqueous ammonia and 40 parts of water to obtain a solution. The resultant solution was added to the above-described suspension while keeping at a temperature not higher than 10° C., and a reaction was conducted while keeping at pH 9.0 with 28% aqueous ammonia. The resultant reaction liquid was heated to 20° C. while keeping at the same pH, so as to conduct a reaction additionally for 8 hours at the same temperature. The amount of the reaction liquid at this time was 225 parts. After this reaction liquid was heated to 50° C., 33.8 parts of sodium chloride was added, and stirring was conducted for 30 minutes, concentrated hydrochloric acid was added to adjust the pH to 1.0 over 20 minutes. Solids deposited were separated by filtration and washed with 100 parts of a 10% aqueous solution of sodium chloride to obtain 62.3 parts of a wet cake. The resultant wet cake was added to 200 parts of water, and the pH was adjusted to 9.0 with a 25% aqueous solution of sodium hydroxide to obtain a liquid. The amount of the liquid at this time was 275 parts. After this liquid was heated to 50° C., 22.5 parts of sodium chloride was added, and stirring was conducted for 30 minutes, the pH was adjusted to 1.0 over 20 minutes with concentrated hydrochloric acid, and solids deposited were separated by filtration. The solids were washed with 100 parts of a 10% aqueous solution of sodium chloride to obtain 37.1 parts of a wet cake. The resultant wet cake was added to a mixed liquid of 160 parts of ethanol and 40 parts of water to prepare a suspension. After this suspension was stirred for 1 hour at 50° C., solids were separated by filtration to obtain a 32.0 parts of a wet cake. The resultant wet cake was dried to obtain 10.0 parts of Compound A represented by the following formula (A) as blue powder. The $\lambda_{max}$ of the resultant Compound A was 605 nm. The number of the benzene ring in Compound A was 3.0, the number of the nitrogen-containing heteroaromatic ring was 1.0, and m, n and the sum of m and n fell within respective ranges of 0<m<3.9, 0.1≤n<4.0, and 1.0≤m+n<4.0. Taking other analytical results into account, it is considered that values of m: about 2.8, n: about 0.2 and m+n: about 3.0 are close to the synthesized Compound A (mixture). The resultant Compound A was used in preparation of an ink by converting a counter ion of the acidic groups to a sodium ion with an aqueous solution of sodium hydroxide.

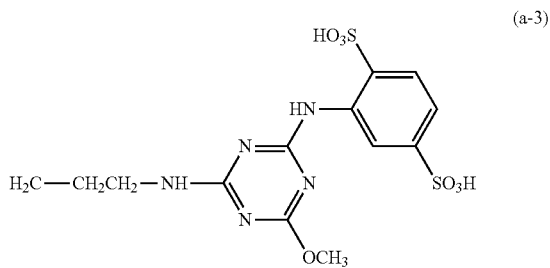

(a-3)

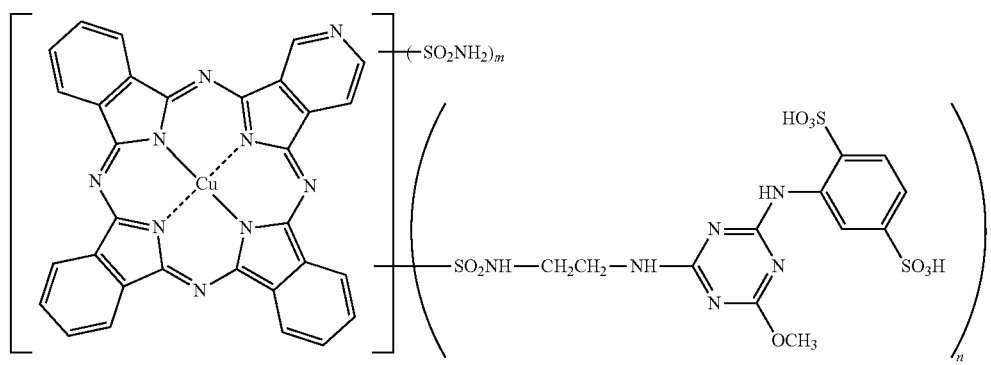

(A)

Synthesis of Compound B
Synthesis of Compound (b-1)

To 220 parts of ethanol were added 36.8 parts of cyanuric chloride, 4 parts of LEOCOL and 16.8 parts of sodium hydrogencarbonate, and a reaction was conducted for 1 hour at a temperature not higher than 30° C. to obtain a reaction liquid containing a primary condensate. To 280 parts of water were added 56.1 parts of 2,5-disulfoaniline and 32 parts of a 25% aqueous solution of sodium hydroxide, thereby adjusting the pH to 3 to 5. The reaction liquid containing the primary condensate obtained in the above-described manner was gradually added to this liquid, and a reaction was further conducted overnight while adjusting the pH to 6 to 7 with a 25% aqueous solution of sodium hydroxide, thereby obtaining a reaction liquid containing a secondary condensate. After 360 parts of hydrochloric acid and 125 parts of iced water were added to the resultant reaction liquid, and the resultant mixture was cooled to 0° C., 120 parts of ethylenediamine was further added dropwise. A reaction was conducted for 2.5 hours at 80° C. while adjusting the pH to 5 to 6 by adding a 25% aqueous solution of sodium hydroxide to the resultant liquid, thereby obtaining a reaction liquid containing a tertiary condensate.

The pH was adjusted to 1.0 by adding 55 parts of hydrochloric acid to the resultant reaction liquid. The amount of the liquid at this time was 1,000 parts. To the resultant liquid 200 parts of sodium chloride was added, stirring was conducted for 30 minutes, and solids deposited were separated by filtration to obtain 183 parts of a wet cake. The resultant wet cake was added to 1,000 parts of water, and the pH was adjusted to 9.0 with a 25% aqueous solution of sodium hydroxide to obtain a liquid. The pH was adjusted to 1.0 by adding 55 parts of hydrochloric acid to the resultant liquid. The amount of the liquid at this time was 1,400 parts. To this liquid 280 parts of sodium chloride was added, stirring was conducted for 30 minutes at room temperature and additionally for 30 minutes at 0° C., and solids deposited were separated by filtration to obtain 60 parts of a wet cake. The resultant wet cake was added to a mixed liquid of 224 parts of methanol and 56 parts of water to prepare a suspension. After the suspension was stirred for 1 hour at 50° C., solids were separated by filtration to obtain a 51.3 parts of a wet cake. The resultant wet cake was dried to obtain 37.0 parts of Compound (b-1) as white powder.

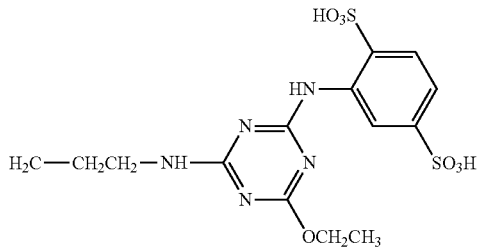

Synthesis of Compound B

Ten parts of Compound B represented by the following formula (B) was obtained as blue powder in the same manner as in the above-described Synthesis of Compound A except that Compound (a-3) was changed to Compound (b-1). The $\lambda_{max}$ of the resultant Compound B was 607 nm. The number of the benzene ring in Compound B was 3.0, the number of the nitrogen-containing heteroaromatic ring was 1.0, and m, n and the sum of m and n fell within respective ranges of 0<m<3.9, 0.1≤n<4.0, and 1.0≤m+n<4.0. Taking other analytical results into account, it is considered that values of m: about 2.8, n: about 0.2 and m+n: about 3.0 are close to the synthesized Compound B (mixture). The resultant Compound B was used in preparation of an ink by converting a counter ion to the acidic groups to a sodium ion with an aqueous solution of sodium hydroxide.

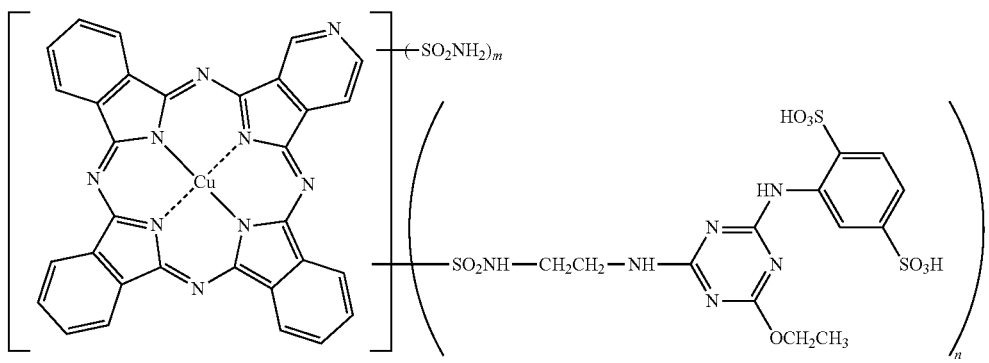

Synthesis of Compound C

Compound C represented by the following formula (C) was synthesized according to the synthetic process described in Japanese Patent Application Laid-Open No. 2004-323605. When m and n in Compound C are represented by average values, m was 2.0, and n was 2.0. Incidentally, when a reaction for introducing a substituent is conducted by using a phthalocyanine compound as described in Japanese Patent Application Laid-Open No. 2004-323605, the substituent is introduced into at least one of positions 3 and 3' (α position) in at least one benzene ring of the phthalocyanine ring. The resultant Compound C was used in preparation of an ink by converting a counter ion to the acidic groups to a sodium ion with an aqueous solution of sodium hydroxide.

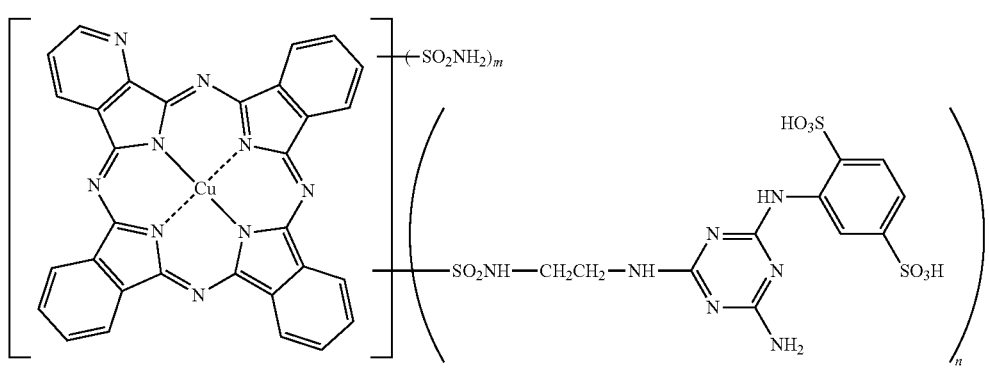

(C)

Synthesis of Compound D

Compound D represented by the following formula (D) was synthesized according to the synthetic process described in International Publication No. 2004/087815. When m and n in Compound D are represented by average values, m was 1.5, and n was 2.5. Incidentally, when a reaction for forming a phthalocyanine ring is conducted by using a raw material into β position of which a substituent has been introduced as described in International Publication No. 2004/087815, the substituent is introduced into only one of positions 4 and 4' (β position) in at least one benzene ring of the phthalocyanine ring. The resultant Compound D was used in preparation of an ink by converting a counter ion of the acidic groups to a sodium ion with an aqueous solution of sodium hydroxide.

Synthesis of Compound E

Compound E represented by the following formula (E) was synthesized according to the synthetic process described in International Publication No. 2007/091631. When m and n in Compound E are represented by average values, m was 2.4, and n was 0.6. The resultant Compound E was used in preparation of an ink by converting a counter ion of the acidic groups to a sodium ion with an aqueous solution of sodium hydroxide.

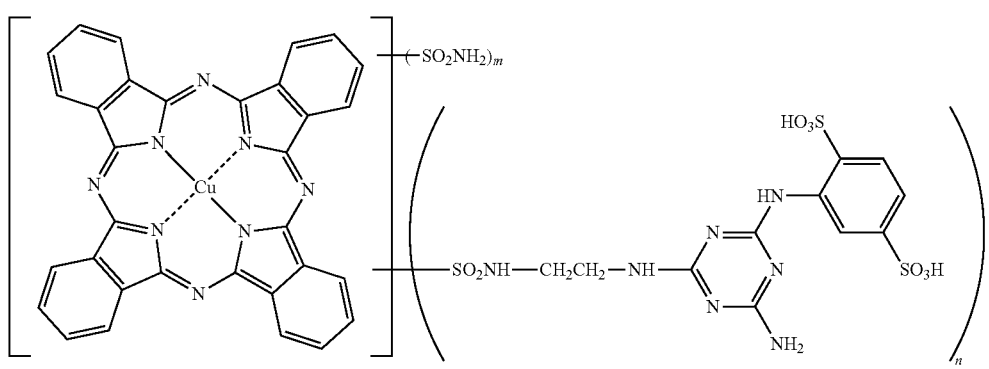

(D)

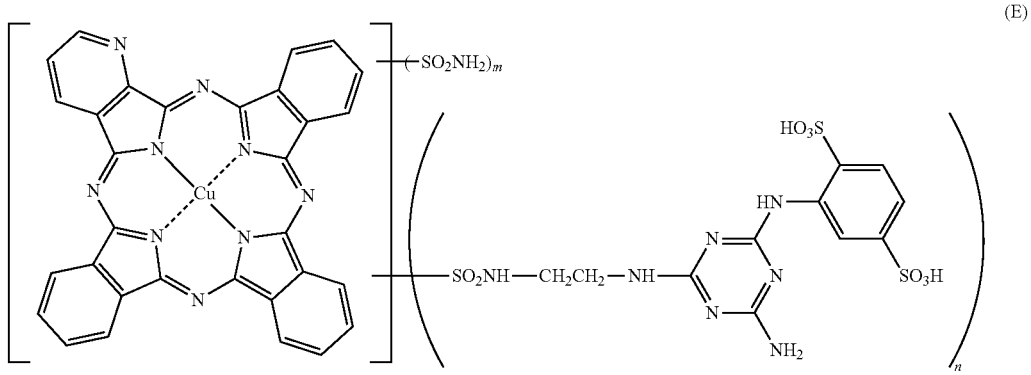

(E)

Synthesis of Compound F

Compound F represented by the following formula (F) was synthesized according to the synthetic process described in Japanese Patent Application Laid-Open No. 2004-002670. When l and m in Compound F represented by as average values, l was 3.0, and m was 1.0. The resultant Compound F was used in preparation of an ink by converting a counter ion of the acidic groups to a lithium ion with an aqueous solution of lithium hydroxide.

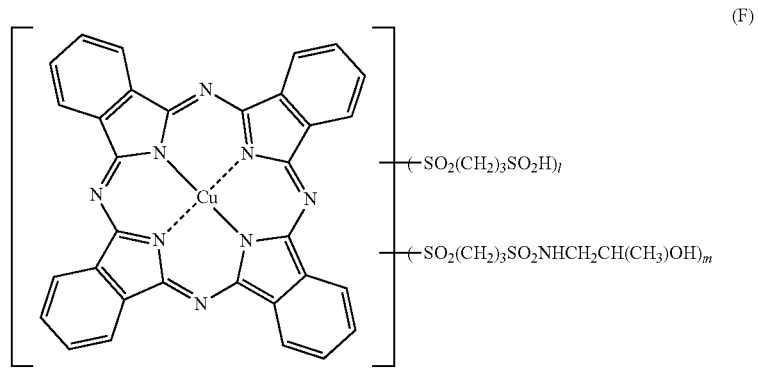

(F)

Compound G

C.I. Direct Blue 199 was used as Compound G.

Compound H

C.I. Acid Blue 9 was used as Compound H.

Preparation of Inks (Examples 1 to 9 and Comparative Examples 1 to 18)

After the respective components (unit: %) shown in upper parts of Tables 2-1 to 2-3 were mixed and sufficiently stirred, the resultant respective mixtures were filtered under pressure through a filter having a pore size of 0.20 μm, thereby preparing respective inks. Incidentally, "Acetylenol E100" in Tables 2-1 to 2-3 is a trade name of a nonionic surfactant (product of Kawaken Fine Chemicals Co., Ltd.) In a lower part in each of Tables 2-1 to 2-3, the value (Content (%) of first coloring material)/(Content (%) of second coloring material) was shown as "First coloring material/Second coloring material (times)".

TABLE 2-1

Compositions and characteristics of inks

| | Example | | | | | | | | |
|---|---|---|---|---|---|---|---|---|---|
| | 1 | 2 | 3 | 4 | 5 | 6 | 7 | 8 | 9 |
| Compound A | 3.0 | 1.0 | 1.2 | 3.2 | 3.4 | | 3.0 | 3.0 | |
| Compound B | | | | | | 3.0 | | | 3.4 |
| Compound C | 1.0 | 3.0 | 2.8 | 0.8 | 0.6 | 1.0 | | | |
| Compound D | | | | | | | 1.0 | | |
| Compound E | | | | | | | | 1.0 | 0.6 |
| Compound F | | | | | | | | | |
| Compound G | | | | | | | | | |
| Compound H | | | | | | | | | |
| Ethylene glycol | 10.0 | 10.0 | 10.0 | 10.0 | 10.0 | 10.0 | 10.0 | 10.0 | 10.0 |
| Diethylene glycol | 10.0 | 10.0 | 10.0 | 10.0 | 10.0 | 10.0 | 10.0 | 10.0 | 10.0 |
| Acetylenol E100 | 1.0 | 1.0 | 1.0 | 1.0 | 1.0 | 1.0 | 1.0 | 1.0 | 1.0 |
| Water | 75.0 | 75.0 | 75.0 | 75.0 | 75.0 | 75.0 | 75.0 | 75.0 | 75.0 |
| First coloring material/Second coloring material (times) | 3.0 | 0.3 | 0.4 | 4.0 | 5.7 | 3.0 | 3.0 | 3.0 | 5.7 |

TABLE 2-2

Compositions and characteristics of inks

| | Comparative Example | | | | | | | | |
|---|---|---|---|---|---|---|---|---|---|
| | 1 | 2 | 3 | 4 | 5 | 6 | 7 | 8 | 9 |
| Compound A | 4.0 | | | | | | | | 3.0 |
| Compound B | | 4.0 | | | | | | | 1.0 |
| Compound C | | | 4.0 | | | | | | |
| Compound D | | | | 4.0 | | | | | |
| Compound E | | | | | 4.0 | | | | |
| Compound F | | | | | | 4.0 | | | |
| Compound G | | | | | | | 4.0 | | |
| Compound H | | | | | | | | 4.0 | |
| Ethylene glycol | 10.0 | 10.0 | 10.0 | 10.0 | 10.0 | 10.0 | 10.0 | 10.0 | 10.0 |
| Diethylene glycol | 10.0 | 10.0 | 10.0 | 10.0 | 10.0 | 10.0 | 10.0 | 10.0 | 10.0 |
| Acetylenol E100 | 1.0 | 1.0 | 1.0 | 1.0 | 1.0 | 1.0 | 1.0 | 1.0 | 1.0 |
| Water | 75.0 | 75.0 | 75.0 | 75.0 | 75.0 | 75.0 | 75.0 | 75.0 | 75.0 |
| First coloring material/ Second coloring material (times) | — | — | 0.0 | 0.0 | 0.0 | — | — | — | — |

TABLE 2-3

Compositions and characteristics of inks

| | Comparative Example | | | | | | | | |
|---|---|---|---|---|---|---|---|---|---|
| | 10 | 11 | 12 | 13 | 14 | 15 | 16 | 17 | 18 |
| Compound A | 3.0 | 3.0 | 3.0 | | | | | | |
| Compound B | | | | | | | | | |
| Compound C | | | | 1.0 | 1.0 | 1.0 | 1.0 | 1.0 | |
| Compound D | | | | 3.0 | | | | | |
| Compound E | | | | | 3.0 | | | | 3.0 |
| Compound F | 1.0 | | | | | 3.0 | | | 1.0 |
| Compound G | | 1.0 | | | | | 3.0 | | |
| Compound H | | | 1.0 | | | | | 3.0 | |
| Ethylene glycol | 10.0 | 10.0 | 10.0 | 10.0 | 10.0 | 10.0 | 10.0 | 10.0 | 10.0 |
| Diethylene glycol | 10.0 | 10.0 | 10.0 | 10.0 | 10.0 | 10.0 | 10.0 | 10.0 | 10.0 |
| Acetylenol E100 | 1.0 | 1.0 | 1.0 | 1.0 | 1.0 | 1.0 | 1.0 | 1.0 | 1.0 |
| Water | 75.0 | 75.0 | 75.0 | 75.0 | 75.0 | 75.0 | 75.0 | 75.0 | 75.0 |
| First coloring material/ Second coloring material (times) | — | — | — | 0.0 | 0.0 | 0.0 | 0.0 | 0.0 | 0.0 |

Evaluation

Each of the inks obtained above was charged into an ink cartridge, and the ink cartridge was installed in an ink jet recording apparatus (trade name "PIXUS Pro 9000 Mark II", manufactured by Canon Inc.) in which an ink is ejected from a recording head by the action of thermal energy. Solid images of respective gradations with recording duty changed from 10% to 180% in an increment of 10% were recorded on a recording medium (trade name "CANON PHOTO-GRAPHIC PAPER•GLOSS PRO [PLATINUM GRADE] PT101", product of Canon Inc.) by means of the above-described ink jet recording apparatus to obtain a recorded article. In this embodiment, a solid image recorded by applying 22 ng of an ink to a unit region of 1/600 inch×1/600 inch is defined as "recording duty of 100%". In the present invention, in the evaluation criteria of the following respective evaluation items, C was regarded as an unacceptable level, and A and B were regarded as an acceptable level. Evaluation results are shown in Table 3.

Color Developability

A spectrophotometer (trade name "Spectrolino", manufactured by Gretag Macbeth Co.) was used to measure an optical density of a cyan component of a solid image whose recording duty was 100% in the resultant recorded article under conditions of a light source of D50 and a visual field of 2°.

Evaluation as to color developability was then made according to the following evaluation criteria.

A: The optical density was 2.3 or more,

B: The optical density was 2.0 or more and less than 2.3,

C: The optical density was less than 2.0.

Ozone Resistance

A spectrophotometer (trade name "Spectrolino", manufactured by Gretag Macbeth Co.) was used to measure an optical density of a cyan component of the solid image of each gradation in the resultant recorded article under conditions of a light source of D50 and a visual field of 2°, thereby specifying a solid image whose optical density was 1.0. This recorded article was put in an ozone fadeometer (trade name "OMS-H", manufactured by Suga Test Instruments) and exposed to ozone for 20 hours under conditions of an intrachamber temperature of 40° C., a relative humidity of 55% and an ozone gas concentration of 10 ppm. Thereafter, the optical density of the cyan component of the same solid image as specified above was measured again. A residual ratio (%) of the optical density was calculated out according to ((Optical density after exposure)/(Optical density before exposure)×100) to make evaluation as to ozone resistance according to the following evaluation criteria.

A: The residual ratio of the optical density was 80% or more,
B: The residual ratio of the optical density was 70% or more and less than 80%,
C: The residual ratio of the optical density was less than 70%.

Bronzing Resistance

A solid image whose recording duty was 70% in the resultant recorded article was visually observed to make evaluation as to bronzing resistance according to the following evaluation criteria.

A: No bronzing phenomenon occurred,
B: Glare from yellow to red tint slightly occurred,
C: Glare from yellow to red tint considerably occurred.

TABLE 3

| | | Evaluation results | | |
| --- | --- | --- | --- | --- |
| | | Ozone resistance | Bronzing resistance | Color developability |
| Example | 1 | A | A | A |
| | 2 | B | A | A |
| | 3 | A | A | A |
| | 4 | A | A | A |
| | 5 | A | B | A |
| | 6 | B | A | A |
| | 7 | A | A | B |
| | 8 | A | A | B |
| | 9 | B | B | B |
| Comparative Example | 1 | A | C | B |
| | 2 | B | C | B |
| | 3 | C | B | A |
| | 4 | C | B | A |
| | 5 | C | B | B |
| | 6 | A | C | C |
| | 7 | C | A | A |
| | 8 | C | A | A |
| | 9 | A | C | B |
| | 10 | A | C | B |
| | 11 | C | B | A |
| | 12 | C | B | A |
| | 13 | C | B | A |
| | 14 | C | A | B |
| | 15 | B | C | C |
| | 16 | C | A | A |
| | 17 | C | A | A |
| | 18 | B | C | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-092382, filed Apr. 13, 2012, which is hereby incorporated by reference herein in its entirety.

What is claimed is:

1. An ink comprising a first coloring material and a second coloring material, wherein;
the first coloring material comprises a compound represented by the following general formula (1), and
the second coloring material comprises a compound represented by the following general formula (2):

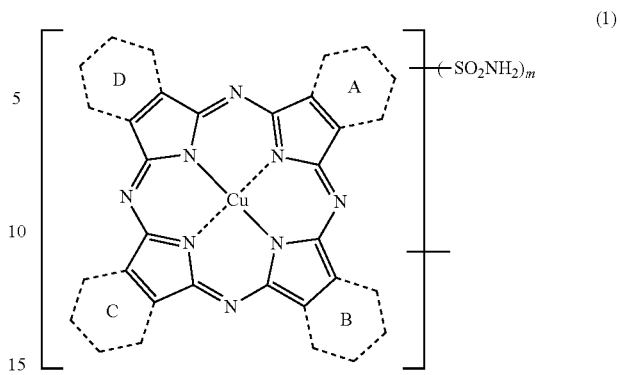

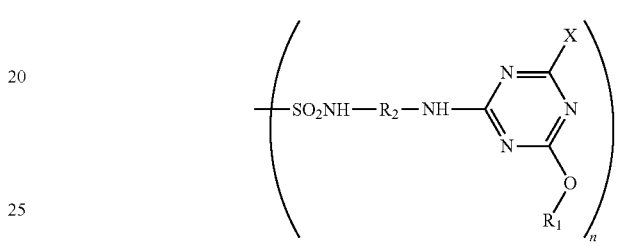

wherein rings A, B, C and D each indicated by a broken line are, independently of one another, a benzene ring or a nitrogen-containing heteroaromatic ring, the number of the nitrogen-containing heteroaromatic ring is more than 0.0 and 3.0 or less, the remainder is the benzene ring, $R_1$ is an alkyl group, $R_2$ is an alkylene group, X is an anilino group having one or more sulfonic groups, with the proviso that X may have one or more substituents selected from the group consisting of a carboxy group, a phosphoric group, a hydroxy group, an alkoxy group, an alkylcarbonylamino group, a ureido group, a nitro group and a halogen atom, m is more than 0.0 and less than 3.9, n is 0.1 or more and less than 4.0, and the sum of m and n is 1.0 or more and less than 4.0;

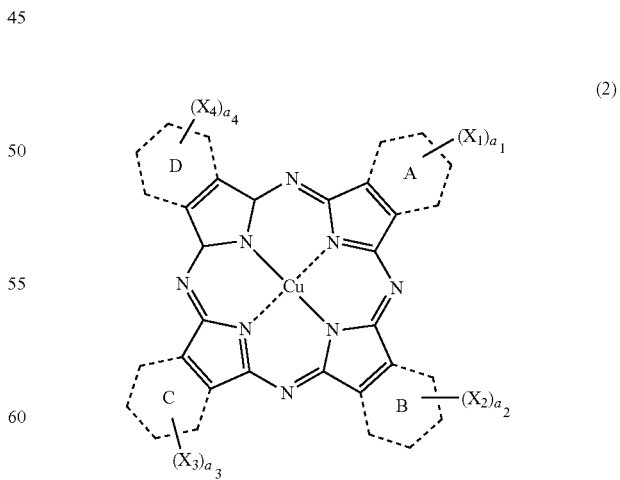

wherein rings A, B, C and D each indicated by a broken line are, independently of one another, a benzene ring or a nitrogen-containing heteroaromatic ring, $X_1$, $X_2$, $X_3$ and $X_4$ are, independently of one another, —SO—Z, —SO$_2$—Z, —SO$_2$NR$_1$R$_2$, —SO$_3$M, —CONR$_1$R$_2$ or —CO$_2$R$_1$, $a_1$, $a_2$, $a_3$ and $a_4$ are respective numbers of substituents of $X_1$, $X_2$, $X_3$ and $X_4$ and are, independently of one another, 1.0 or more and 2.0 or less, Z is a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, $R_1$ and $R_2$ are, independently of each other, a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, M is a hydrogen atom, an alkali metal, ammonium or organic ammonium, and at least one of $X_1$, $X_2$, $X_3$ and $X_4$ is a group represented by the following general formula (3):

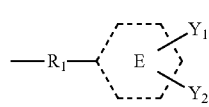

(3)

wherein a ring E indicated by a broken line is a benzene ring or a nitrogen-containing heteroaromatic ring, $R_1$ is a linking group containing an atom selected from the group consisting of sulfur, nitrogen, oxygen and carbon in a main chain thereof and linking the phthalocyanine ring to the ring E indicated by the broken line by a covalent bond, and $Y_1$ and $Y_2$ are, independently of each other, a hydrogen atom, a halogen atom, an alkyl group, an aryl group, a cyano group, an alkoxy group, an amide group, a ureido group, a sulfonamide group, a carbamoyl group, a sulfamoyl group, an alkoxycarbonyl group, a carboxy group, a sulfonic group, an amino group or a substituted or unsubstituted anilino group.

2. The ink according to claim 1, wherein the content (% by mass) of the first coloring material based on the total mass of the ink is 0.4 times or more and 4.0 times or less in terms of mass ratio with respect to the content (% by mass) of the second coloring material.

3. The ink according to claim 1, wherein the first coloring material is a compound represented by the following general formula (4):

wherein rings A, B, C and D each indicated by a broken line are, independently of one another, a benzene ring or a nitrogen-containing heteroaromatic ring, the number of the nitrogen-containing heteroaromatic ring is more than 0.0 and 3.0 or less, the remainder is the benzene ring, M's are, independently of each other, a hydrogen atom, an alkali metal, ammonium or organic ammonium, m is more than 0.0 and less than 3.9, n is 0.1 or more and less than 4.0, and the sum of m and n is 1.0 or more and less than 4.0.

4. The ink according to claim 1, wherein when the nitrogen-containing heteroaromatic ring in the first coloring material is a pyridine ring with the position of the nitrogen atom in the pyridine ring as position 1, fused ring positions of the pyridine ring with the porphyrazine ring in the general formula (1) are positions 2 and 3 or positions 3 and 4.

5. The ink according to claim 1, wherein the second coloring material is a compound represented by the following general formula (5):

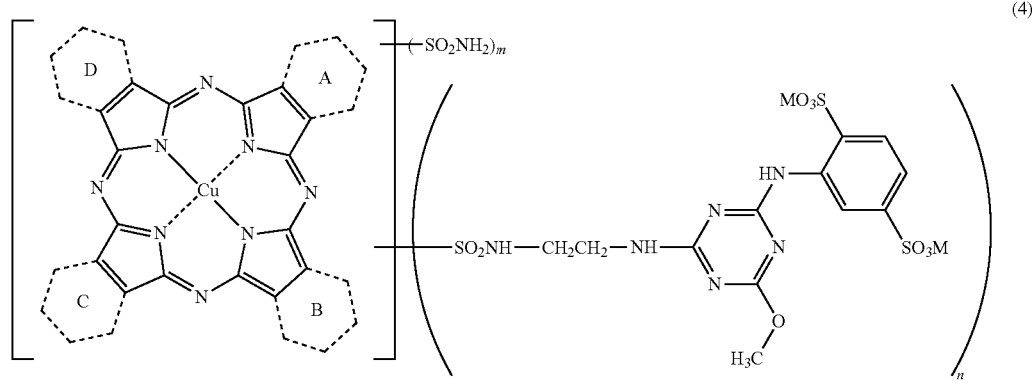

(4)

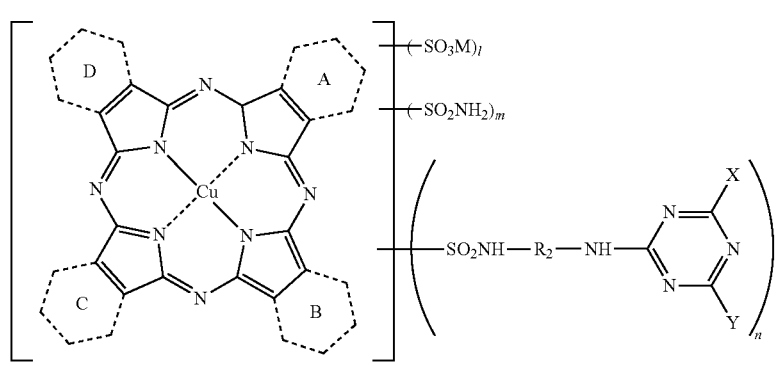

(5)

wherein rings A, B, C and D are, independently of one another, a 6-membered ring having an aromatic nature, M is a hydrogen atom, an alkali metal, ammonium or organic ammonium, $R_2$ is an alkylene group, X is a sulfonic-group-substituted anilino group, a carboxy-group-substituted anilino group or a phosphonic-group-substituted anilino group, Y is a hydroxy group or an amino group, l is 0.0 or more and 2.0 or less, m is more than 0.0 and 3.0 or less, n is 0.1 or more and 3.0 or less, the sum of l, m and n is 1.0 or more and 4.0 or less, and X may further have 0 to 4 substituents selected from the group consisting of a sulfonic group, a carboxy group, a phosphonic group, a sulfamoyl group, a carbamoyl group, a hydroxy group, an alkoxy group, an amino group, an alkylamino group, a dialkylamino group, an arylamino group, a diarylamino group, an acetylamino group, a ureido group, an alkyl group, a nitro group, a cyano group, a halogen atom, an alkylsulfonyl group and an alkylthio group.

6. The ink according to claim 1, wherein the second coloring material is a compound represented by the following general formula (6):

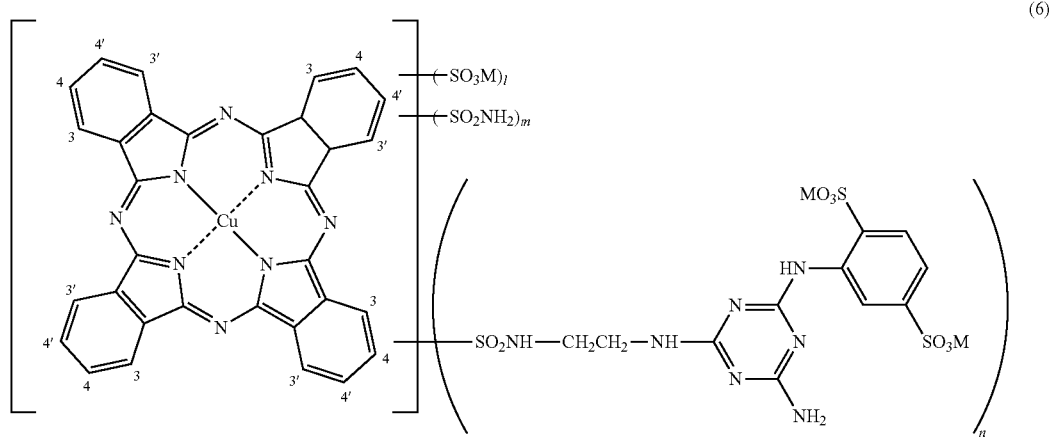

(6)

wherein M's are, independently of each other, a hydrogen atom, an alkali metal, ammonium or organic ammonium, l is 0.0 or more and 2.0 or less, m is 1.0 or more and 3.0 or less, n is 1.0 or more and 3.0 or less, the sum of l, m and n is 2.0 or more and 4.0 or less, and the substituent is introduced into at least one of positions 3 and 3' in one or more benzene rings constituting the phthalocyanine ring.

7. An ink cartridge comprising an ink and an ink storage portion storing the ink, wherein the ink comprises the ink according to claim 1.

8. An ink jet recording method comprising ejecting an ink from a recording head of an ink jet system to record an image on a recording medium, wherein the ink comprises the ink according to claim 1.

* * * * *